(12) United States Patent
Brenner et al.

(10) Patent No.: US 11,501,478 B2
(45) Date of Patent: Nov. 15, 2022

(54) SYSTEM AND METHOD OF AUTOMATIC ROOM SEGMENTATION FOR TWO-DIMENSIONAL LASER FLOORPLANS

(71) Applicant: FARO Technologies, Inc., Lake Mary, FL (US)

(72) Inventors: Mark Brenner, Asperg (DE); Aleksej Frank, Kornwestheim (DE); Oliver Zweigle, Stuttgart (DE); Ahmad Ramadneh, Kornwestheim (DE); Mufassar Waheed, Ditzingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 17/325,947

(22) Filed: May 20, 2021

(65) Prior Publication Data
US 2022/0051459 A1 Feb. 17, 2022

Related U.S. Application Data

(60) Provisional application No. 63/066,443, filed on Aug. 17, 2020.

(51) Int. Cl.
*G06T 11/60* (2006.01)
*G06T 7/70* (2017.01)
(Continued)

(52) U.S. Cl.
CPC .............. *G06T 11/60* (2013.01); *G06T 7/11* (2017.01); *G06T 7/70* (2017.01); *G06V 30/422* (2022.01);
(Continued)

(58) Field of Classification Search
None
See application file for complete search history.

(56) References Cited

U.S. PATENT DOCUMENTS 6,246,468 B1 6/2001 Dimsdale
6,542,249 B1 4/2003 Kofman et al.
(Continued)

OTHER PUBLICATIONS

Babacan et al., "Semantic Segmentation of Indoor Point Clouds Using Convolutional Neural Network" ISPRS Annais of Photogrammerty, Remote Sensing & Spatial Information Sciences, 4, 2017, 8 pages.
(Continued)

*Primary Examiner* — Frank S Chen
(74) *Attorney, Agent, or Firm* — Cantor Colburn LLP

(57) ABSTRACT

A system for generating an automatically segmented and annotated two-dimensional (2D) map of an environment includes processors coupled to a scanner to convert a 2D map from the scanner into a 2D image. Further, a mapping system categorizes a first set of pixels from the image into one of room-inside, room-outside, and noise by applying a trained neural network to the image. The mapping system further categorizes a first subset of pixels from the first set of pixels based on a room type if the first subset of pixels is categorized as room-inside. The mapping system also determines the room type of a second subset of pixels from the first set of pixels based on the first subset of pixels by using a flooding algorithm. The mapping system further annotates a portion of the 2D map to identify the room type based on the pixels corresponding to the portion.

19 Claims, 24 Drawing Sheets

(51) Int. Cl.
*G06T 7/11* (2017.01)
*G06V 30/422* (2022.01)
*G01S 17/89* (2020.01)
*G01S 17/42* (2006.01)

(52) U.S. Cl.
CPC ............... *G01S 17/42* (2013.01); *G01S 17/89* (2013.01); *G06T 2207/10028* (2013.01); *G06T 2207/20084* (2013.01)

(56) References Cited

U.S. PATENT DOCUMENTS

| | | |
|---|---|---|
| 6,748,112 B1 | 6/2004 | Nguyen |
| 7,069,124 B1 | 6/2006 | Whittaker et al. |
| 7,327,857 B2 | 2/2008 | Lloyd, Jr. |
| 8,019,042 B2 | 9/2011 | Shukla |
| 8,384,914 B2 | 2/2013 | Becker et al. |
| 8,447,069 B2 | 5/2013 | Huang |
| 8,467,992 B1 | 6/2013 | Doyle |
| 8,625,106 B2 | 1/2014 | Ossig et al. |
| 8,699,005 B2 | 4/2014 | Likholyot |
| 8,699,007 B2 | 4/2014 | Becker et al. |
| 8,699,036 B2 | 4/2014 | Ditte et al. |
| 8,705,012 B2 | 4/2014 | Greiner et al. |
| 8,705,016 B2 | 4/2014 | Schumann et al. |
| 8,705,893 B1 | 4/2014 | Zhang |
| 8,730,477 B2 | 5/2014 | Ruhland et al. |
| 8,811,767 B2 | 8/2014 | Veeraraghaven et al. |
| 8,830,485 B2 | 9/2014 | Woloschyn |
| 8,896,819 B2 | 11/2014 | Schumann et al. |
| 8,970,823 B2 | 3/2015 | Heidemann et al. |
| 9,025,861 B2 | 5/2015 | Furukawa |
| 9,074,883 B2 | 7/2015 | Schumann et al. |
| 9,279,662 B2 | 3/2016 | Steffey et al. |
| 9,329,271 B2 | 5/2016 | Ossig et al. |
| 9,342,890 B2 | 5/2016 | Becker et al. |
| 9,372,265 B2 | 6/2016 | Zweigle et al. |
| 9,417,316 B2 | 8/2016 | Schumann et al. |
| 9,513,107 B2 | 12/2016 | Zweigle et al. |
| 9,599,455 B2 | 3/2017 | Heidemann et al. |
| 9,618,620 B2 | 4/2017 | Zweigle et al. |
| 9,739,886 B2 | 8/2017 | Zweigle et al. |
| 9,746,559 B2 | 8/2017 | Zweigle et al. |
| 9,756,263 B2 | 9/2017 | Kester |
| 9,910,937 B2 | 3/2018 | Patwan |
| 9,964,409 B1 | 5/2018 | Flint |
| 9,977,978 B2 | 5/2018 | Coulter |
| 10,025,798 B2 | 7/2018 | Kaminka |
| 10,084,975 B2 | 9/2018 | Kester |
| 10,127,667 B2 | 11/2018 | Kennedy |
| 10,210,285 B2 | 2/2019 | Wong et al. |
| 10,269,135 B2 | 4/2019 | Chen |
| 10,275,894 B2 | 4/2019 | Saini |
| 10,282,854 B2 | 5/2019 | Zweigle et al. |
| 10,303,966 B2 | 5/2019 | Coulter |
| 10,339,384 B2 | 7/2019 | Lorenzo |
| 10,388,018 B2 | 8/2019 | Nakagomi |
| 10,460,173 B2 | 10/2019 | Sasson |
| 10,657,691 B2 | 5/2020 | Zweigle |
| 10,746,980 B2 | 8/2020 | Kenny |
| 10,776,836 B2 | 9/2020 | Fan |
| 2004/0027347 A1 | 2/2004 | Farsaie |
| 2006/0110026 A1 | 5/2006 | Strassenburg-Kleciak |
| 2009/0323121 A1 | 12/2009 | Valkenburg et al. |
| 2010/0134596 A1 | 6/2010 | Becker |
| 2010/0228517 A1* | 9/2010 | Wike, Jr. ................ G01S 17/14 356/28 |
| 2011/0288684 A1 | 11/2011 | Farlow et al. |
| 2012/0069352 A1 | 3/2012 | Ossig et al. |
| 2013/0314688 A1 | 11/2013 | Likholyot |
| 2014/0016114 A1 | 1/2014 | Lopez et al. |
| 2014/0063489 A1 | 3/2014 | Steffey et al. |
| 2014/0078150 A1 | 3/2014 | Li |
| 2014/0078519 A1 | 3/2014 | Steffey et al. |
| 2014/0226190 A1 | 8/2014 | Bridges et al. |
| 2014/0240690 A1 | 8/2014 | Newman et al. |
| 2014/0300906 A1 | 10/2014 | Becker et al. |
| 2014/0362424 A1 | 12/2014 | Bridges et al. |
| 2015/0085068 A1 | 3/2015 | Becker et al. |
| 2015/0085301 A1 | 3/2015 | Becker et al. |
| 2015/0086070 A1 | 3/2015 | Deng |
| 2015/0160342 A1 | 6/2015 | Zweigle et al. |
| 2015/0160347 A1 | 6/2015 | Zweigle et al. |
| 2016/0047914 A1 | 2/2016 | Zweigle et al. |
| 2016/0170197 A1 | 6/2016 | Kenny et al. |
| 2016/0282107 A1 | 9/2016 | Roland et al. |
| 2018/0012125 A1 | 1/2018 | Ladha et al. |
| 2018/0100927 A1 | 4/2018 | Zweigle et al. |
| 2018/0137605 A1* | 5/2018 | Otsuka ..................... G06T 7/11 |
| 2018/0283877 A1 | 10/2018 | Flint |
| 2018/0285482 A1 | 10/2018 | Santos et al. |
| 2018/0315162 A1 | 11/2018 | Sturm |
| 2019/0178643 A1 | 6/2019 | Metzler et al. |
| 2019/0266293 A1 | 8/2019 | Ishida |
| 2019/0304150 A1 | 10/2019 | Zweigle |
| 2019/0340433 A1 | 11/2019 | Frank |
| 2020/0301440 A1 | 9/2020 | Ferguson |
| 2020/0334832 A1 | 10/2020 | Den Hollander |
| 2021/0073449 A1* | 3/2021 | Segev ..................... G06N 5/025 |
| 2021/0279950 A1* | 9/2021 | Phalak ................... G06V 20/64 |
| 2022/0027656 A1* | 1/2022 | Jia ............................ G06T 7/33 |

OTHER PUBLICATIONS

Bosse et al., "Zebedee: Design of a Spring-Mounted 3-D Range Sensor with Application to Mobile Mapping", IEEE Transactions on Robotics 28.5, 2012, pp. 1104-1119.

Censi, "An ICP variant using a point-to-line metric," 2008 IEEE International Conference on Robotics and Automation, May 19-23, 2008, pp. 19-25.

Dasgupta et al., "DeLay: Robust Spatial Layout Estimation for Cluttered Indoor Scenes", Proceedings of the IEEE conference on computer vision and pattern recognition, 2016, 9 pages.

Mazumdar et al., "Generating indoor maps by crowdsourcing positioning data from smartphones", 2014 International Conference on Indoor-Positioning and Indoor Navigation (IPIN), IEEE, 2014, 10 pages.

Pintore et al., "Omnidirectional image capture on mobile devices for fast automatic generation of 2.5D indoor maps", 2016 IEEE Winter Conference on Applications of Computer Vision (WACV), IEEE, 2016, 9 pages.

Triebel et al., "Instance-based AMN Classification for Improved Object Recognition in 2D and 3D Laser Range Data", Proceedings of the 20th international joint conference of Artificial intelligence, Morgan Kaufmann Publishers Inc., 2007, 6 pages.

Turner et al., "Floor Plan Generation and Room Laveling of Indoor Envirnoments from Laser Range Data" 2014 International Conference on Computer Graphics Theory and Applications (GRAPP), IEEE, 2014, 12 pages.

Zeng et al., "Deep Floor Plan Recognition Using a Multi-Task Network with Room-Boundary-Guided Attention," arXiv:1908. 11025v1, Aug. 29, 2019, 9 pages.

Zhang et al., "Automatic Identification of Window Regions on Indoor Point Clouds Using LiDAR and Cameras", IEEE winter conference on applications of computer vision, IEEE, 2014, 8 pages.

Zhang et al., "Learning to Predict High-Quality Edge Maps for Room Layout Esitmation", IEEE Transactions on Multimedia 19.5 (2017), pp. 935-943.

* cited by examiner

SYSTEM AND METHOD OF AUTOMATIC ROOM SEGMENTATION FOR TWO-DIMENSIONAL LASER FLOORPLANS

CROSS REFERENCE TO RELATED APPLICATIONS

This application claims the benefit of U.S. Provisional Application Ser. No. 63/066,443, filed Aug. 17, 2020, the entire disclosure of which is incorporated herein by reference.

BACKGROUND

The present application is directed to a system that optically scans an environment, such as a building, and in particular to a portable system that generates two-dimensional (2D) floorplans of the scanned environment and that uses a vision-based sensor to facilitate automatic room segmentation for 2D floorplan annotation.

The automated creation of digital 2D floorplans for existing structures is desirable as it allows the size and shape of the environment to be used in many processes. For example, a floorplan may be desirable to allow construction drawings to be prepared during a renovation. Such floorplans may find other uses such as in documenting a building for a fire department or to document a crime scene, in the planning of construction or remodeling of a building, and the like.

Existing measurement systems typically use a scanning device that determines coordinates of surfaces in the environment by emitting a light and capturing a reflection to determine a distance, or by triangulation using cameras. These scanning devices are mounted to a movable structure, such as a cart, and moved through the building to generate a digital representation of the building. These systems tend to be more complex and require specialized personnel to perform the scan. Further, the scanning equipment including the movable structure may be bulky, which could further delay the scanning process in time sensitive situations, such as a crime or accident scene investigation.

Further, human input is required to add context to digital 2D floorplans. Added context can include labeling objects such as windows and doors to extract wall lines for use in room segmentation. Additional added context that can be added by a user includes annotations such as room type labels (e.g., kitchen, living room, etc.). Current methods of manually labeling digital 2D floorplans can be time-consuming.

Accordingly, while existing scanning systems are suitable for their intended purposes, what is needed is a system for having certain features of embodiments of the technical solutions described herein.

BRIEF DESCRIPTION

According to one or more embodiments, a system for generating an automatically segmented and annotated two-dimensional (2D) map of an environment is described. The system includes a scanner configured to capture a 2D map comprising one or more point clouds comprising coordinate measurements of one or more points from the environment. The system further includes one or more processors operably coupled to the scanner, the one or more processors being responsive to executable instructions for converting the 2D map into a 2D image. The system further includes a mapping system configured to categorize a first set of pixels from the image into room-inside, room-outside, and noise by applying a trained neural network to the image. The mapping system further categorizes a first subset of pixels from the first set of pixels based on a room type, the first subset of pixels comprising pixels that are categorized as room-inside. The mapping system also determines the room type of a second subset of pixels from the first set of pixels based on the first subset of pixels by using a flooding algorithm. The mapping system further annotates a portion of the 2D map to identify the room type based on the room type associated with one or more pixels corresponding to the portion.

The system further includes a portable computing device having a second image sensor, the portable computing device being coupled for communication to the one or more processors, wherein the one or more processors are responsive to correlate a location captured by a first image from the portable computing device with the location in the 2D map of the environment in response to the first image being acquired by the second image sensor.

In one or more embodiments, the mapping system is further configured to perform automatic segmentation of the 2D image subsequent to the categorization of the pixels from the image.

In one or more embodiments, the automatic segmentation is performed using one or more of morphological segmentation, Voronoi segmentation, and distance-based segmentation. The annotating further includes determining a label that identifies a type of an object and adding the label to the 2D map proximate to a location of the object.

In one or more embodiments, the label of the object is wall, and the updating the 2D map includes adding the wall to the 2D map as a geometric element at the location.

In one or more embodiments, the scanner is a 2D scanner disposed in a body of a housing, the housing being sized to be carried by a single person during operation, the body having a first plane extending there through.

In other embodiments, the features of the system described herein can be implemented as a method, a computer program product, or any other form.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the technical solutions described herein, together with advantages and features, by way of example with reference to the drawings.

DETAILED DESCRIPTION

The technical solutions described herein relate to a device that includes a system having a coordinate measurement scanner that works cooperatively with an inertial measurement unit and an image or vision-based sensor to generate a two-dimensional (2D) map of an environment. As used herein, the term "2D map" refers to a representation of the environment measured by a scanner. The 2D map can be represented internally as a grid map that includes a 2D arranged collection of cells, representing an area of the environment. The grid map stores, for every cell, a probability indicating whether the cell area is occupied or not.

An embodiment of the technical solutions described herein provides a framework for automatically segmenting rooms and areas of interest in 2D floor plan maps using locations of doors and windows that are identified by applying artificial intelligence image recognition techniques to images captured by a vision-based sensor. In addition, room labels (e.g., "kitchen", "living room", "office", etc.) can be automatically placed on a 2D map using the image recognition techniques described herein. Embodiments of the technical solutions described herein can be used for 2D floor planning, location-based documentation, automatic 2D floorplan labeling, and/or computer aided design (CAD) export. The ability to provide automatic segmentation and annotation of 2D maps can expedite the process of documenting buildings, crime scenes, and other locations.

It should be appreciated that while embodiments herein describe the 2D map generation as being based on measurements by a 2D scanner, this is for exemplary purposes and the claims should not be so limited. In other embodiments, the 2D maps may be generated by data acquired by three-dimensional (3D) coordinate measurement devices, such as but not limited to a laser scanner, a laser tracker, a laser line probe, an image scanner or a triangulation scanner for example.

Figure 1:
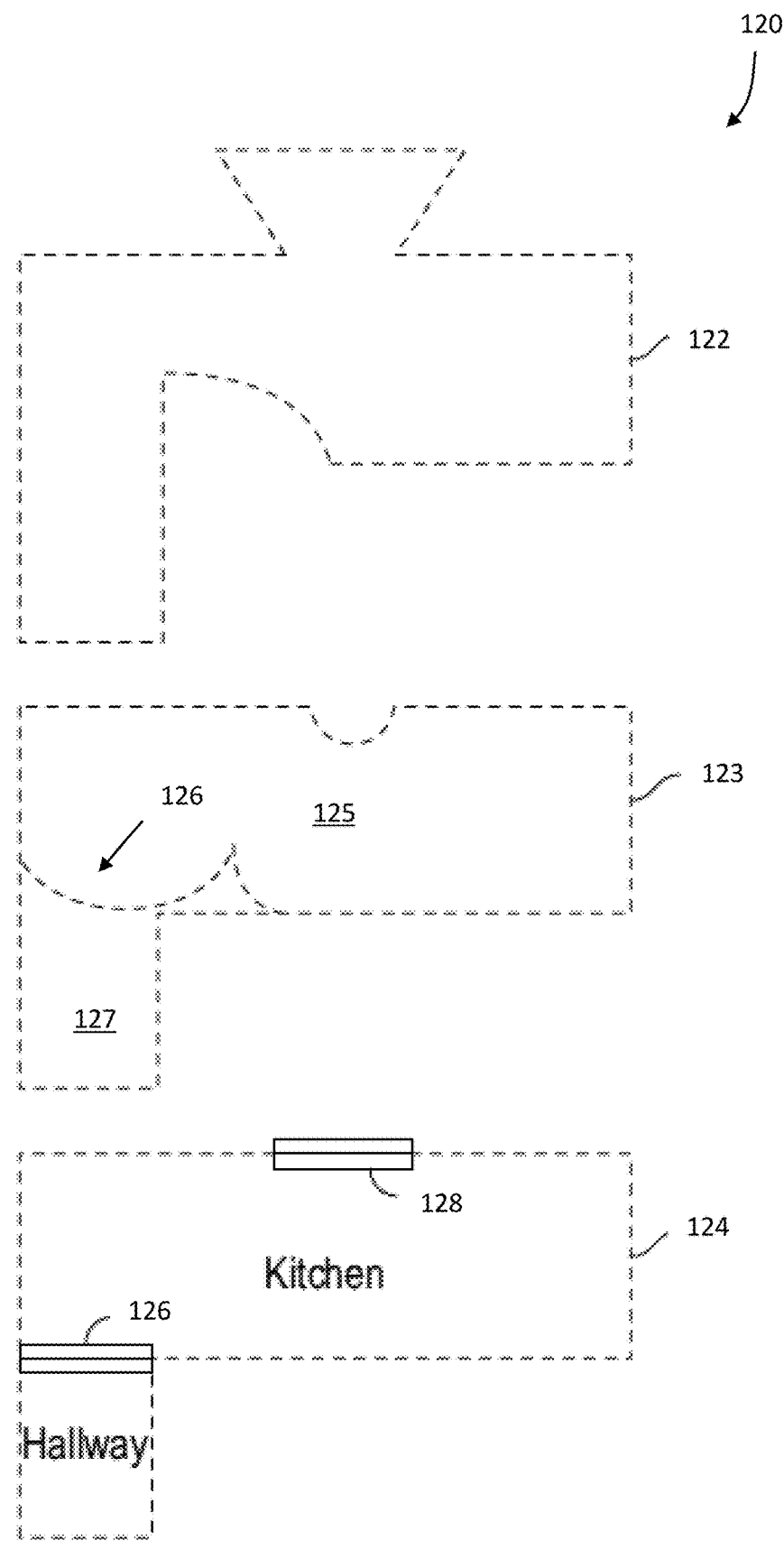
FIG. 1 is an illustration of two-dimensional (2D) maps of an area generated by a mapping system in accordance with an embodiment.

For example, as shown in FIG. 1, a scan is performed using a coordinate measurement device, which generates an unsegmented and unlabeled 2D map 122 of a space inside of a building. Applying one or more contemporary segmentation techniques (e.g., morphological segmentation, Voronoi segmentation, and distance-based segmentation) results in 2D map 123 with segments 125 and 127. The size and boundaries of segments 125 and 127 in 2D map 123 do not accurately reflect the actual rooms of the space that was scanned due, for example, to on an open door 126 between space 125 and 127 when the scan was taken.

In existing systems, the 2D map 123 that is generated has to be manually edited, for example, using a software tool to obtain a floor plan. During such editing, a user identifies sections, for example, rooms, hallways, doors, windows, etc. in the 2D map 123. Such identification may not be possible due to damaged or missing data in the 2D map 123 in some situations. Also, once the rooms and other sections are identified in the floor plan annotations can be automatically added to the floor plan e.g. the room area.

Technical solutions provided by embodiments described herein provide more accurate segmentation of a scanned space by providing context to 2D maps prior to applying segmentation techniques. 2D map 124 in FIG. 1 is generated by adding context, such as locations of doors and windows, to 2D map 122 prior to applying a segmentation technique. In an embodiment, objects such as doors and windows in the scanned space are identified by applying artificial intelligence image recognition techniques to a video stream generated by a vision-based sensor. The identified door 126 is used to segment the space into a kitchen and a hallway. In addition, as shown in 2D map 124, scan data in 2D map 122 of locations outside of the identified window 128 are removed. In an embodiment, image recognition techniques are also used to identify objects in the image stream such as, but not limited to sinks, dishwashers, beds, and showers. The identified objects are used to automatically label the segmented areas. As shown in 2D map 124, the areas are annotated with labels, for example, "kitchen" and "hallway." In one or more embodiments of the technical solutions described herein, the areas are also annotated with information such as, area, dimensions, etc. The segmenting and labeling described herein are performed automatically and without user intervention.

Figure 2:
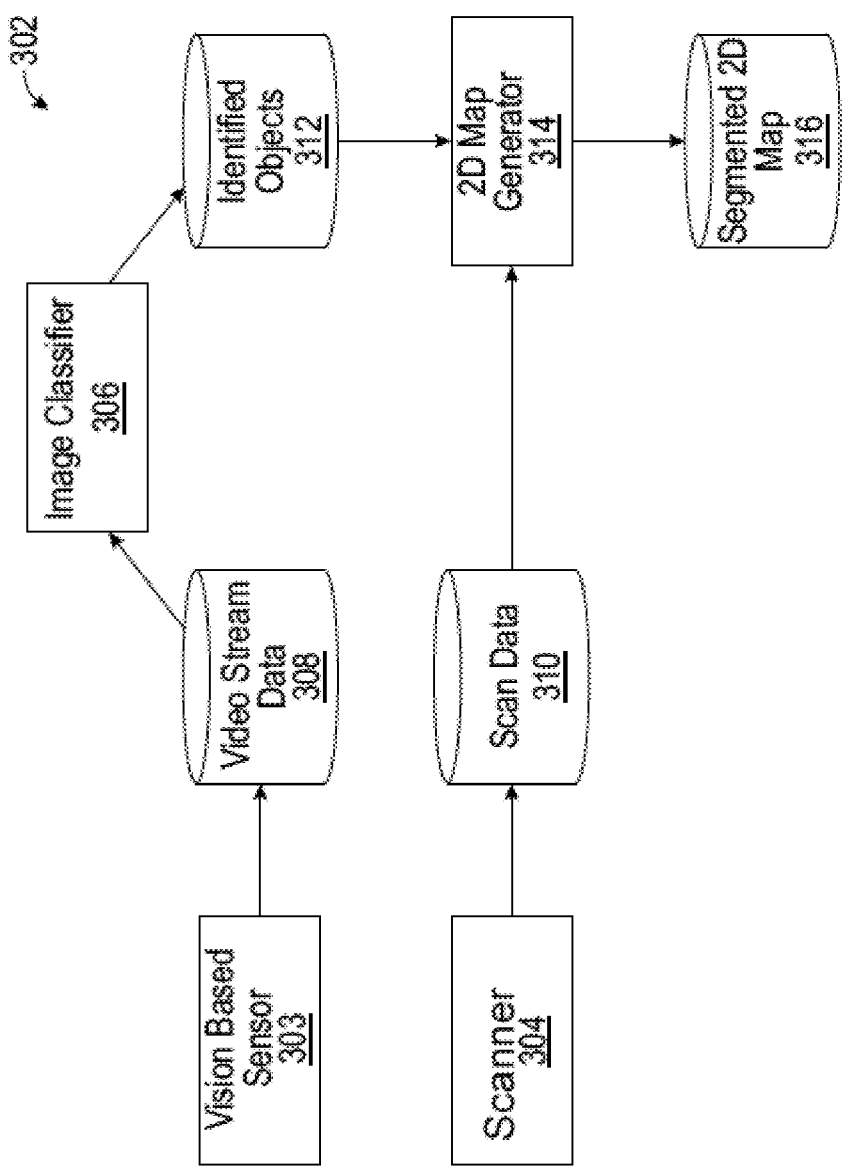
FIG. 2 is a flow diagram of a process for utilizing output from a vision-based sensor in conjunction with scan data to facilitate automatic room segmentation in accordance with an embodiment.

Turning now to FIG. 2, a flow diagram 302 of a mapping system for utilizing output from a vision-based sensor in conjunction with scan data to facilitate automatic room segmentation is generally shown in accordance with an embodiment of the technical solutions described herein. The flow diagram shown in FIG. 2 automatically extracts wall lines (e.g., based on locations of windows and doors) from a 2D map and then performs automatic room segmentation based at least in part on the extracted wall lines. In addition, the processing shown in FIG. 2 can be utilized for providing descriptive labels for rooms in a floorplan of a 2D map based on contents of the rooms.

The 2D maps provided by the processes and apparatuses described above allow the user to capture the geometry/shape of a given environment. Embodiments described herein add additional context information to the 2D maps to describe the functionality of the different rooms in the environment as well as the location of additional geometric primitives (e.g., lines, etc.). Applying labels to a 2D map facilitates a user sharing information about the environment with others without having to spend time describing the 2D map. While the user that mapped the environment can identify the different regions and rooms of the environment in the 2D map, other users that were not present during the mapping task or in the same environment might struggle to link the different areas of the 2D floorplan to the different rooms of the mapped environment. An embodiment of the technical solutions described herein provides the processing flow shown in FIG. 2 to allow a scanner, such as 2D scanner described herein, in conjunction with an image sensor to automatically identify rooms and areas of interest in a 2D map such as those shown in FIGS. herein.

As shown in FIG. 2, scan data 310 is generated by a scanner 304, and video stream data 308 is generated by an image or vision-based sensor 303. The scanner 304 can be implemented, for example, by 2D scanner described herein. In an embodiment, the vision-based sensor 303 is implemented by a camera or video recorder or other image sensor located in a mobile computing device (e.g. personal digital assistant, cellular phone, tablet or laptop) carried by the operator for example. In an embodiment, the system 300 described above includes a holder (not shown) that couples the mobile computing device to the system 300. In an alternate embodiment, the vision-based sensor 303 is implemented by the 3D camera 1060. In still other embodiments, the vision-based sensor may be a 2D camera that is integral with the scanner 304.

As shown in FIG. 2, the scan data 310 is input to the 2D map generator 314 and the video stream data 308 made up of individual images is input to an classifier 306. As used herein, the term "video" or "video stream data" refers to a series of sequential images acquired by the vision-based sensor at a predetermined frame rate, such as 30 frames per second (fps) or 60 frames per second for example. The classifier 306 analyzes the images in the video stream data 308 to identify objects such as doors and windows. The identified objects 312 are output by the classifier 306 and input to the 2D map generator 314. The 2D map generator 314 generates a 2D map using for example, the processing described herein. In addition, the 2D map is segmented into rooms, or areas, based at least in part on where the identified objects 312 are located in the 2D map. For example, locations of the doors and windows can be added to the 2D map to define wall lines which can be used in segmenting the space into rooms and/or areas of interest. In an embodiment where a hand-held scanner is used, the location of the object in the image is determined by a mapping/localization algorithm executing on the hand-held scanner. When the object is detected, the object position can be determined by considering the hand-held scanner position and the mobile device position relative to the hand-held scanner.

Alternatively, or in addition, the system 300 uses algorithms that can segment data using either neural networks or filling algorithms or a combination of both, where such segmentation groups similar data from the 2D map. For this to be accomplished on a map captured by the scanner, in one or more embodiments of the technical solutions described herein, the map is converted into an image (pixel data). Subsequently, each pixel is assigned a type e.g. room-boundary or room-type by performing classification described above, e.g. using a neural network. Furthermore, the pixels, which have now been classified, can have subclasses like bathroom, bedroom, hallway etc. to be able to determine specific rooms. The results may be postprocessed e.g. by flooding algorithms to unify the pixels in one room, i.e., pixels of a particular type. The resulting segmentations are further used to identify different rooms and/or to try to make a classification of the room type. Thus, the rooms and other contents of the map can be identified from the 2D map data itself, without using images from the video stream data 308 in this case. In one or more embodiments of the technical solutions described herein, the video stream data can be used to improve the results obtained from the map data itself.

In one or more embodiments of the technical solutions described herein, once the room and its boundaries are determined using the pixelated data, further annotations are added by converting the image back into the map. For example, the area of a room can be calculated and the label automatically added to the floor plan. Alternatively, labels added can include a name of the room, one or more contents of the room, and so on.

In addition, to defining additional wall lines for use in automatic segmentation, the components shown in FIG. 2 can be used to label the rooms in the segmented 2D map 316 based on contents of the rooms as shown in the video stream data 308. For example, the classifier 306 can be trained to recognize common household or office objects, and the 2D map generator 314 can include logic that labels a room based on the objects that it contains. The segmented 2D map 316 is output by the 2D map generator 314 to a user and/or to a storage device.

Figure 3:
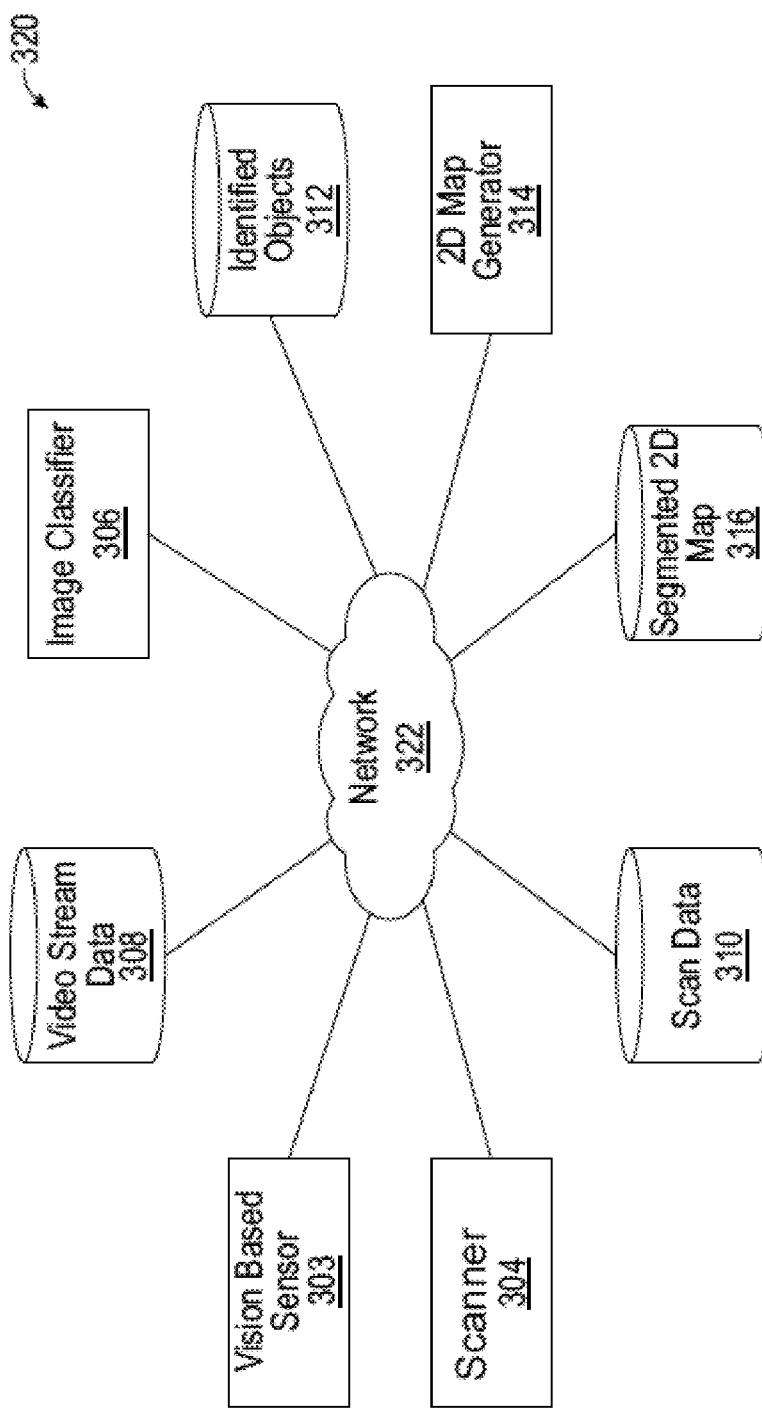
FIG. 3 is a schematic diagram of components of the flow diagram shown in FIG. 2 in accordance with an embodiment.

Turning now to FIG. 3, a schematic diagram 320 of components of the mapping system shown in FIG. 2 is generally shown in accordance with one or more embodiments of the technical solutions described herein. In the embodiment shown in FIG. 3, all of the components are accessible via the network 322. In another embodiment (not shown) the components shown in FIG. 2 are all located on the same system, such as system 300 described herein. In another embodiment, only a subset of the components shown in FIG. 2 is located on the system 300. For example, the vision-based sensor 303 and the scanner 304 can both be located on the system 300, the classifier 306 located on a first processor, and the 2D map generator 314 located on a second processor. Other distribution of the components is possible in other embodiments.

The network 322 shown in FIG. 3 can include one or more of any type of known networks including, but not limited to, a wide area network (WAN), a local area network (LAN), a global network (e.g. Internet), a virtual private network (VPN), and an intranet. The network 322 can include a private network in which access thereto is restricted to authorized members. The network 322 can be implemented using wireless networking technologies or any kind of physical network implementation known in the art. The components shown in FIG. 3 may be coupled to one or more other components through multiple networks (e.g., Internet, intranet, and private network) so that not all components are coupled to other components through the same network 322.

Figure 4:
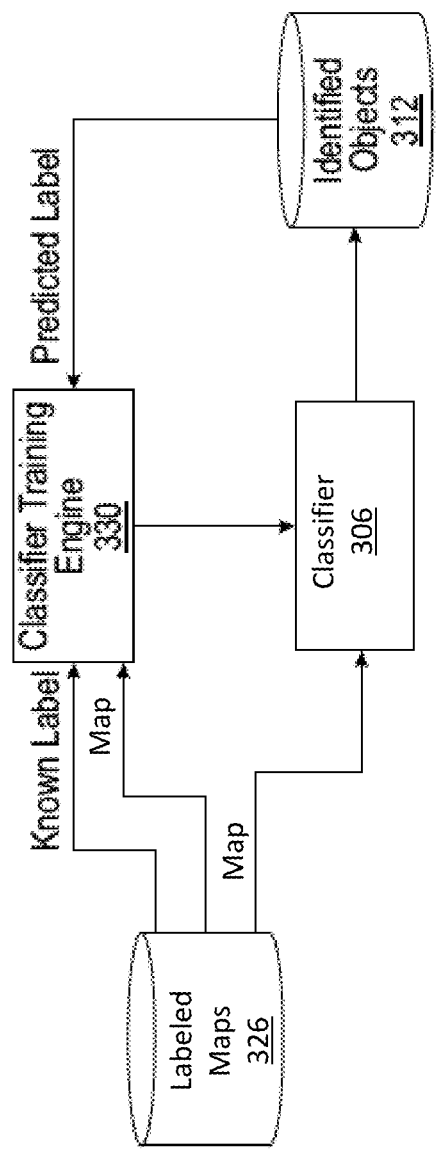
FIG. 4 is a flow diagram of process for training an image classifier to recognize objects in image data in accordance with an embodiment.

In an embodiment, the artificial intelligence-based classifier 306 is a neural network inference engine. FIG. 4 depicts a data flow of training the classifier 306 according to one or more embodiments of the technical solutions described herein. As shown in FIG. 4, training data includes labeled maps 326 which include maps and their corresponding known segmentation labels that have been previously generated by a human analyst. For each <map, labels-set> pair in the labeled maps 326, the 2D map data is input to the classifier 306, and the classifier 306 outputs a label of an identified object, or a predicated label. The predicted label for the known map is compared, by the classifier training engine 330 to the known label. Based on the results of the comparison, the classifier training engine 330 may update the classifier 306.

The classifier training engine 330 can use a loss function to compare a predicted label with a known label. The results of the comparison can be used by the classifier training engine 330 to determine adjustments to neural network biases and weightings to improve accuracy and reduce the loss function. The determined adjustments are input to the classifier 306. The process shown in FIG. 4 can be repeated iteratively to minimize the loss function and maximize the accuracy of predictions. In one or more embodiments of the technical solutions described herein, portions of the neural network shown in FIG. 4 are implemented by off-the-shelf software. For example, Python and C++ frameworks such as, but not limited to TensorFlow™, PyBrain, Theano, Torch, and Caffe can be used to implement the neural network. The neural network can include a combination of one or more types of neural networks, such as convolutional neural network (CNN), attention models, encoders, decoders, etc. Various neural network architectures can be used and trained to predict room boundaries, and room types using trained label data 326.

In one or more embodiments of the technical solutions described herein, multiple neural networks can be used together to predict the room type. A first neural network can be used to identify room boundaries, and a second neural network can be used identify objects, or features in the map 122. The room boundaries and the locations of the objects/features are used in conjunction to predict a room type. For example, consider a pixel that is identified to be inside-room, where the room boundary has a window, and the pixel is associated with an object like a bed, a dresser, an end-table, etc., results in that pixel to be labeled as 'bedroom'. Further, a pixel that is associated with an office-desk is labeled as 'office', while a pixel that is associated with an oven is labeled as 'kitchen', etc. It should be noted that the brief description of using the neural networks together to predict the room type is just one example. Several neural network architectures, which can include different types of neural networks than those described herein, can be used to determine room types, without limiting the practical application(s) provided by embodiments described herein.

Figure 5:
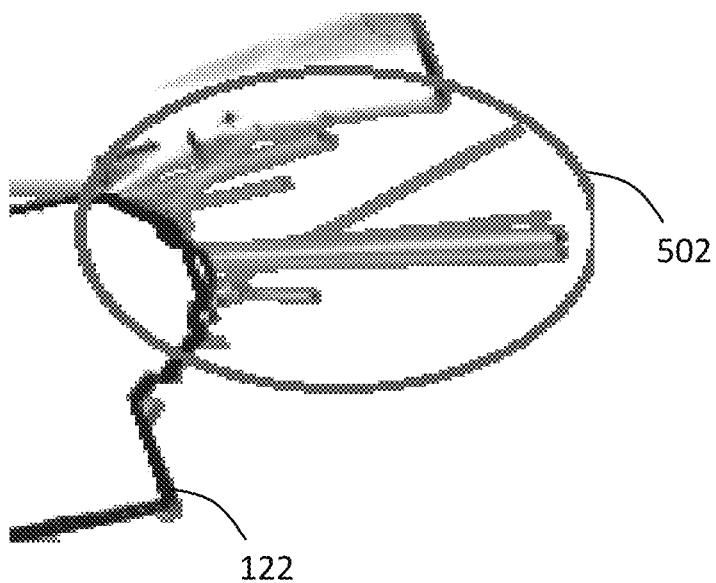
FIG. 5 depicts pixels to be categorized as noise in image data in accordance with an embodiment.

In an embodiment, the labeled maps 326 used for training include 2D map data that is converted into image data, i.e., a set of pixels. In an embodiment, the labeled maps 326 used for training include labels for this data that categorize each of the pixels into categories such as: inside-room, outside-room, and wrong measurements/noise. Here, the label "inside-room" identifies as the pixel being inside a particular room or area that is to be mapped (bedroom, bathroom, kitchen, hallway, etc.), the label "outside-room" identifies the pixel being outside any of the rooms that are to be mapped. The "wrong measurements/noise" class is used to identify pixels which belong to laser beams going through windows, or other transparent material, resulting in noise on the maps. Such noise 502 looks quite specific and is distinguishable from the actual data. An example of such noise 502 in a map 122 is shown in FIG. 5.

In one or more embodiments of the technical solutions described herein, room-inside pixels are further grouped into different types of rooms e.g. hallway, office, bathroom, production halls etc. The identification of these rooms can be performed based on type of content in the room. To be able to detect content of the rooms, one or more filters that are typically used by scanners, are reduced. Such reduction in the filters produces more data than usual, for content which is typically filtered out. Furthermore, the room boundaries are used to identify the room type of pixels nearby. The boundary classification or data from the network is made accessible to the classifier 306 to facilitate such use of proximity information.

Figure 6:
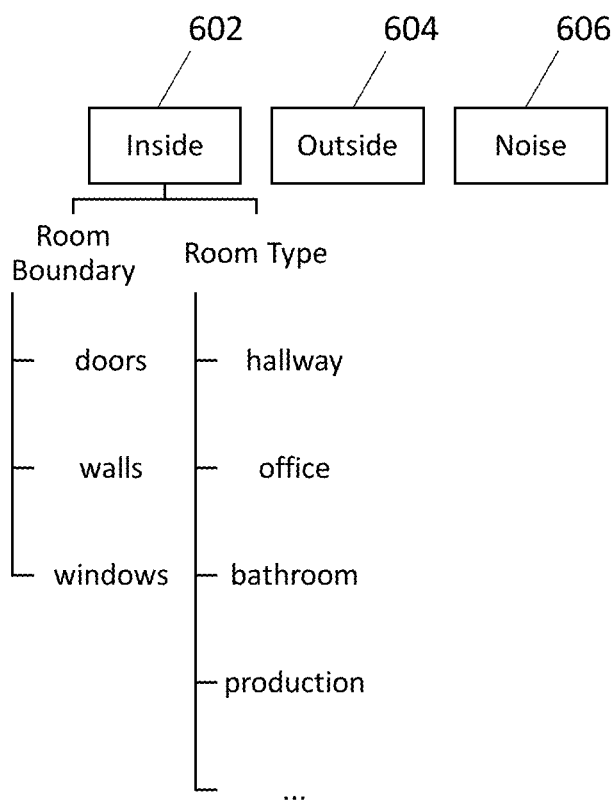
FIG. 6 depicts an overview of the classes used to categories pixels of the image data from a 2D map according to one or more embodiments of the technical solutions described herein.

FIG. 6 depicts an overview of the classes used to categories pixels of the image data from a 2D map according to one or more embodiments of the technical solutions described herein. It is understood that the categorization structure that is depicted is one possible example from several other possible categorizations. In the particular case depicted, the pixels are categorized as discussed herein, inside (602), outside (604), noise (606). The inside (602) category is further subclassified into particular rooms as discussed herein. In one or more embodiments of the technical solutions described herein, multiple neural networks, i.e., classifiers 306 are trained for different applications e.g. one network for apartments, one for office buildings, one for single family homes, etc. to reduce the number of categories for a single classifier 306.

Objects that can be helpful in identifying a descriptive label for a room in a 2D floorplan (e.g., kitchen, bathroom, etc.) can be further used by the classifier 306 when making a prediction. For example, the room can be labeled as a bathroom if it has a shower or as a kitchen if it contains a stove. The labeled maps 326 that are used to train the classifier 306 can be created by a third party in one or more embodiments of the technical solutions described herein. For example, builders, architects, etc. can provide their typical floor plans that are labeled to identify particular rooms. Alternatively, or in addition, the labeled maps 326 include images converted from point cloud data that is captured by one or more scanners and labeled manually.

In embodiments, objects can also be recognized using methods such as region-based convolutional neural networks (R-CNNs) and you only look once (YOLO) real-time object recognition, or other methods that rely on qualitative spatial reasoning (QSR).

Figure 7:
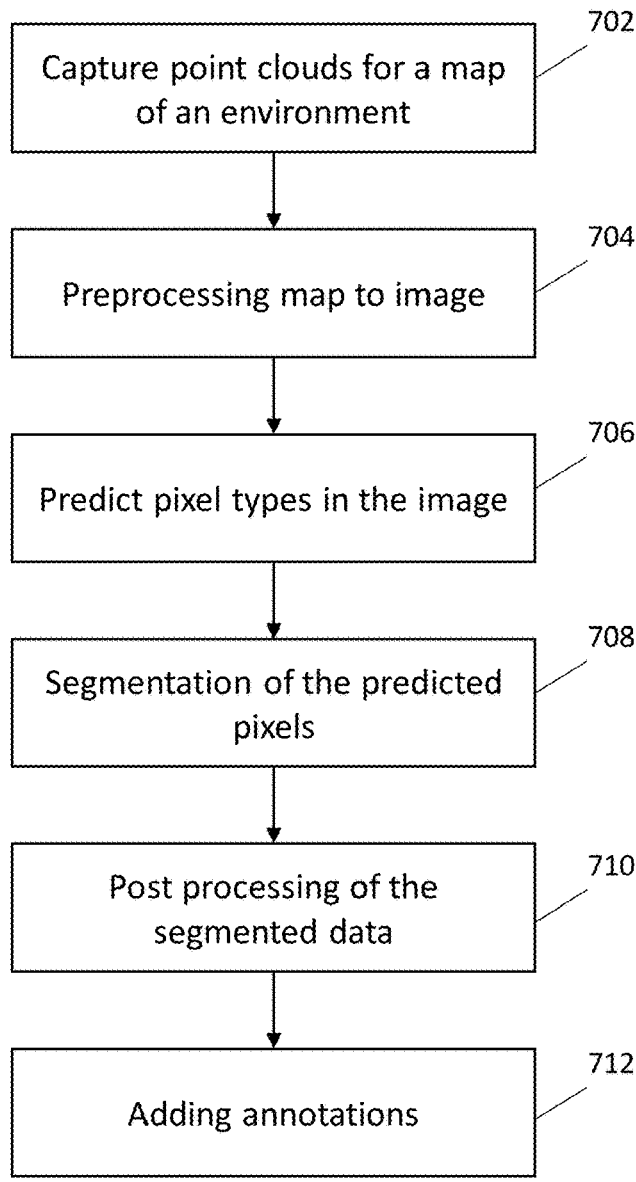
FIG. 7 depicts a flow diagram of a method for generating a 2D map, including automatically segmenting rooms in the 2D map in accordance with an embodiment of the technical solutions described herein.

Turning now to FIG. 7, a flow diagram of a method for generating a 2D map, including automatically segmenting rooms in the 2D map, is generally shown in accordance with an embodiment of the technical solutions described herein. The method 700 shown in FIG. 7 can be implemented by computer instructions executing on a processor.

The method 700 includes capturing one or more point clouds that represent the environment that is to be scanned by the scanner, at block 702. The point clouds are registered, aligned, merged, and/or a combination thereof, to obtain the 2D map 122. Further, the method 700 includes preprocessing the map, which includes converting the 2D map 122 into an image, i.e., set of pixels, at block 704. It should be noted that the image is separate from the images/video streams that are captured by an image sensor that is associated with the scanner.

Further, the method 700 includes analyzing the image with the classifier 306, which has already been trained using <map, label-set> training data, at block 706. The classifier 306 labels each pixel in the image using the predetermined categories. First, each pixel is labeled as being inside-room, outside-room, or noise. Further, each pixel that is labeled as being inside-room, is labeled with a particular type of room, e.g., kitchen, hallway, bathroom, bedroom, etc. The outside-room pixels can represent the room boundaries, or a space in the environment that is not to be mapped, in one or more embodiments of the technical solutions described herein. The pixels that are recognized as being artifacts caused because of the scanner beams being reflected/refraction are classified as noise.

The method 700 further includes segmenting the pixels in the image to determine all the pixels that are part of the same room, at block 708. The segmentation includes grouping the pixels that are marked with the same labels together. For example, the pixels marked room-inside are in a first segment, the pixels marked room-outside are in a second segment, and the pixels marked noise are in a third segment. Further, the pixels in the segment corresponding to the label room-inside, are further segmented according to the type of room. For example, the pixels in the first segment are further grouped into pixels marked bedroom, hallway, kitchen, etc.

Types of automatic segmentation that can be applied include, but are not limited to morphological segmentation, Voronoi segmentation, and/or distance-based segmentation. In morphological segmentation erosion is iteratively applied to the 2D map (binary image). Whenever erosion is performed, the method looks for separate regions and marks them so they are not part of the search in the next iteration. Voronoi segmentation includes computing a Voronoi diagram over the 2D map. A Voronoi diagram includes the partitioning of a plane with n points into convex polygons such that each polygon contains exactly one generating point and every point in a given polygon is closer to its generating point than to any other point. The different points in the Voronoi diagram are then grouped, and for each group of points, a search for the point with the smallest distance to occupied cells in the 2D map is conducted, which is then connected to the two closest occupied cells, creating a "frontier." This is performed to every group of points resulting in separation of the different areas of the map, each of these areas are then marked as a different room. In distance-base segmentation a distance transform is calculated over the 2D map in order to identify the center of the room (local maxima). The room centers are then labeled and extended into the non-labeled space using wave front propagation.

Further, the method 700 includes post-processing the image using pixels that have been associated with labels so far, at block 710. For example, the method 700 includes selecting a first pixel from the set of pixels that have been labeled with a room type. Further, the method 700 includes using flooding algorithm to select, sequentially or in parallel, neighboring pixels of the first pixel. If a neighboring pixel is labeled already with a room type, that pixel is skipped at this time. If the neighboring pixel is not labeled with a room type, and if the neighboring pixel is room-inside based on the room boundaries, that neighboring pixel can be labels the same as the first pixel. Such flooding is repeated until all the labeled pixels are selected and their respective neighbors examined and labeled, if required. It should be noted that neighboring pixels that are labeled as room-outside or noise are not labeled with a room type. In this manner, all of the pixels are labeled with their respective room types (except the pixels that are outside-room or noise).

Further, once the room type and its boundaries are determined annotations are added, at block 712. In one or more embodiments of the technical solutions described herein, the image is reconverted into the map 122. Alternatively, in one or more embodiments of the technical solutions described herein, the image with the labeled pixels is used as a reference to annotate the map 122. The type of room is used from the image and added to the map 122 as an annotation at corresponding position. The corresponding position is determined by registering the image with the 2D map 122. Further, in one or more embodiments of the technical solutions described herein, dimensions of the room can be used to calculate features such as, the area of a room, and add such calculations automatically to the map 122 as part of the annotations. In one or more embodiments of the technical solutions described herein, the classification of the room boundary type, object types, etc., are also added as annotations to the map 122, for example, to identify windows, doors, walls, desks, beds, ovens, and other such objects/features.

The automatically segmented 2D map is output for storage in a storage device and/or output to a display.

The technical solutions described herein identify features, including objects and room types, in the environment being scanned more accurately to reflect the actual environment when compared to contemporary approaches. Further, the technical solutions described herein can identify such features without using image sensor accessories, rather only using a scanner that captures point clouds that represent a 2D map of the environment.

Figure 8:
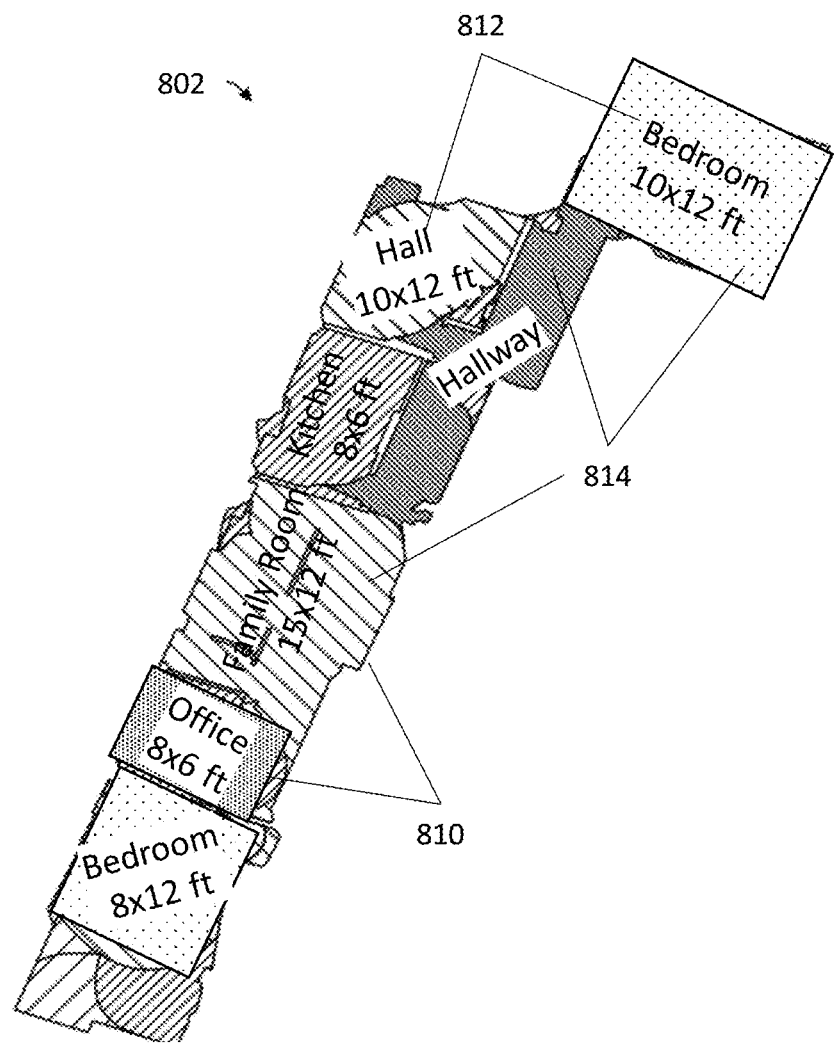
FIG. 8 is an example of a 2D map generated using automatic segmentation that takes into account locations of doors and windows in accordance with an embodiment.

FIG. 8 depicts an example of a 2D map 802 that was automatically segmented and annotated in accordance with an embodiment of the technical solutions described herein. The 2D map 802 in FIG. 8 is contrasted with 2D map 122 shown in FIG. 1, which is an example of a 2D map prior to performing any of the processing described herein. The segmented and annotated map 802 identifies boundaries 810 of the rooms, and room types using annotations 812 as well as visual attributes 814 (e.g., shading, color, etc.). In one or more embodiments of the technical solutions described herein, the annotations can further include dimensions, area, and other such attributes that can be identified using the scan data that is captured. Each of the room types can be assigned a specific visual attribute.

In an embodiment, the segmented and annotated map 802 can be used for CAD export. The AI-based object recognition process and 2D map generation described previously identifies and labels door locations (not shown).

Figure 9:
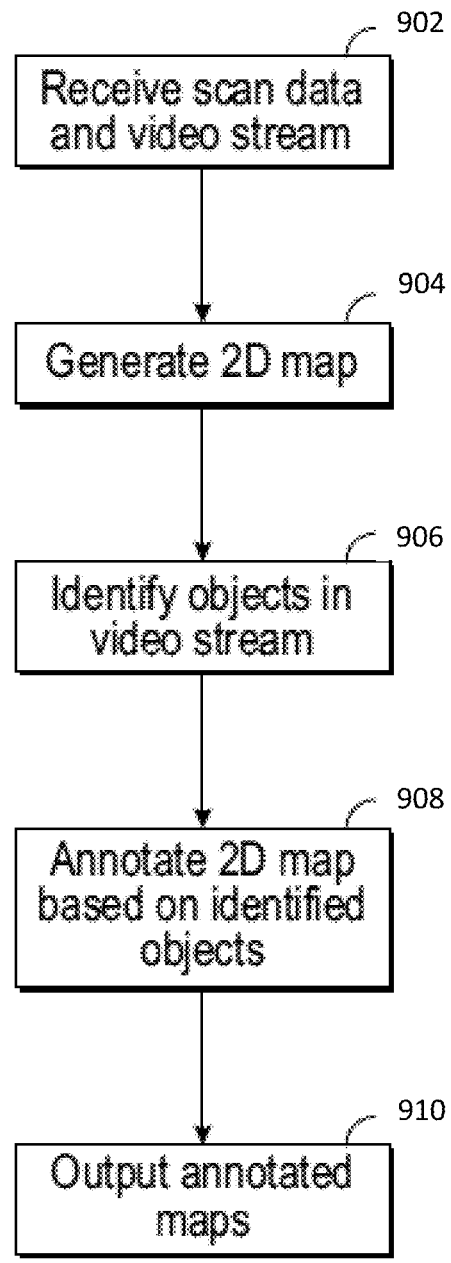
FIG. 9 is a flow diagram of a process for annotating a 2D map in accordance with an embodiment.

Turning now to FIG. 9, a flow diagram of a method for annotating a 2D map is generally shown in accordance with an embodiment. The process shown in FIG. 9 can be implemented by computer instructions executing on a processor. Descriptive labels for segments, or rooms, in the 2D map 802 are generated using AI to identify objects in the room, and then by applying a label based on the identified objects. For example, if a room contains a stove and a refrigerator, then it can be given the label "kitchen", and if the room contains a table and chairs but no stove or refrigerator then it can be labeled "dining room." The labeling is not limited to households. For example, in a workplace, a room having an office chair and a computer monitor can be labeled "office" and a room having a long table and several office chairs can be labeled "conference room."

At block 902, scan data is received from a scanner, and corresponding video stream data is received from a vision-based sensor. At block 904, a 2D map 802 is generated using for example, the processing described herein. The generated 2D map 802 is segmented and pixels of the same type are grouped, however the room types are not annotated at this time. An example of the 2D map 802 generated is shown in FIG. 8. At block 906, the classifier 306 identifies objects in the video stream data at locations in the 2D map 802. Such object identification can be performed using known AI techniques, such as neural networks. Processing continues at block 908 where the 2D map 802 is annotated based on the identified objects. At block 910, the annotated 2D map 802 is output for storage in a storage device and/or output to a display. An example of an annotated 2D map is 2D map 124 of FIG. 1, and or the annotated map 802 in FIG. 8.

In an embodiment, blocks 906-910 are performed after block 710 in FIG. 7 to label rooms in an automatically segmented 2D map.

Figure 10A:
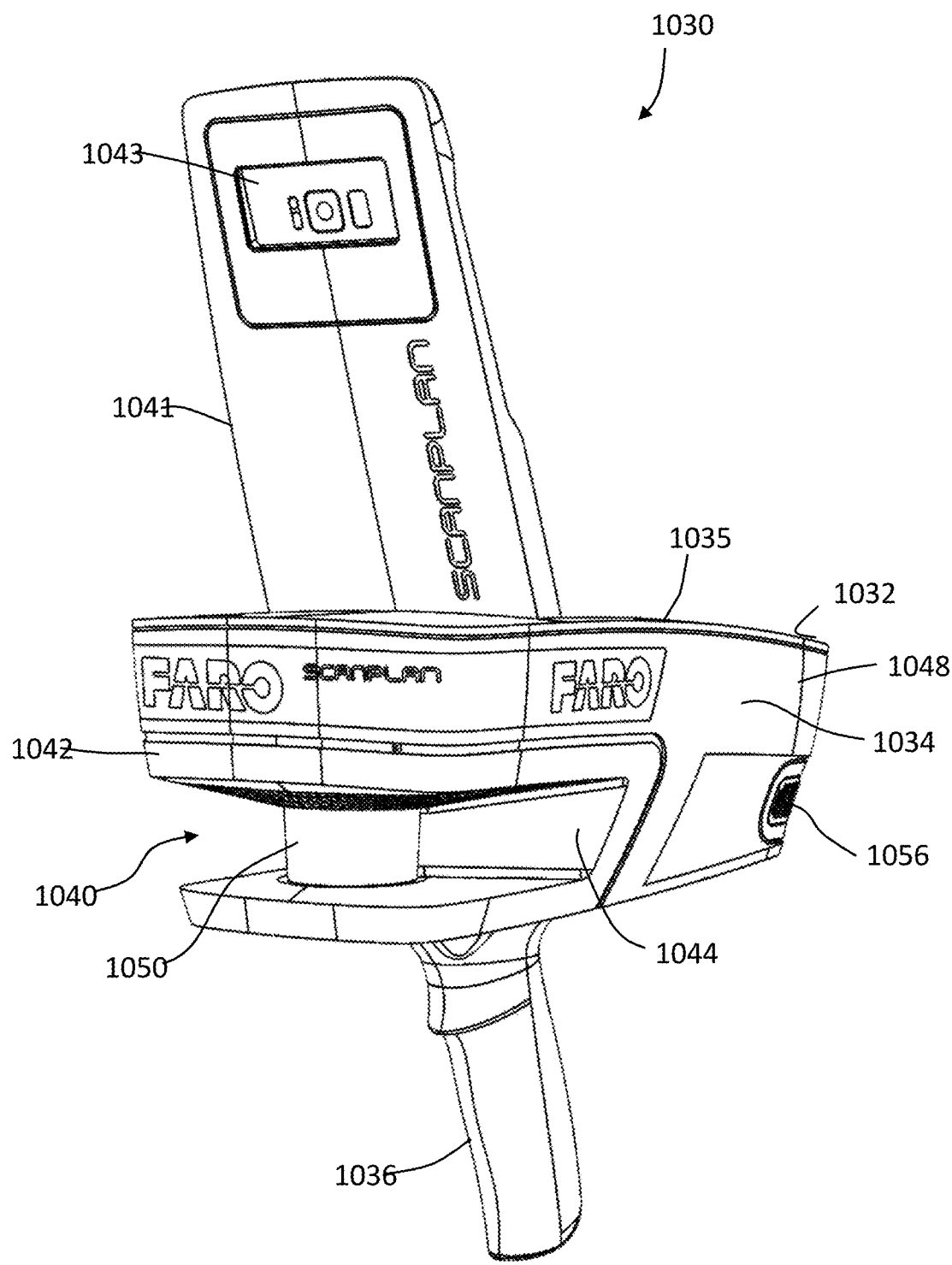
FIGS. 10A-10R depict an embodiment of structure and usage of a 2D scanner in accordance with technical solutions described herein.
Figure 10B:
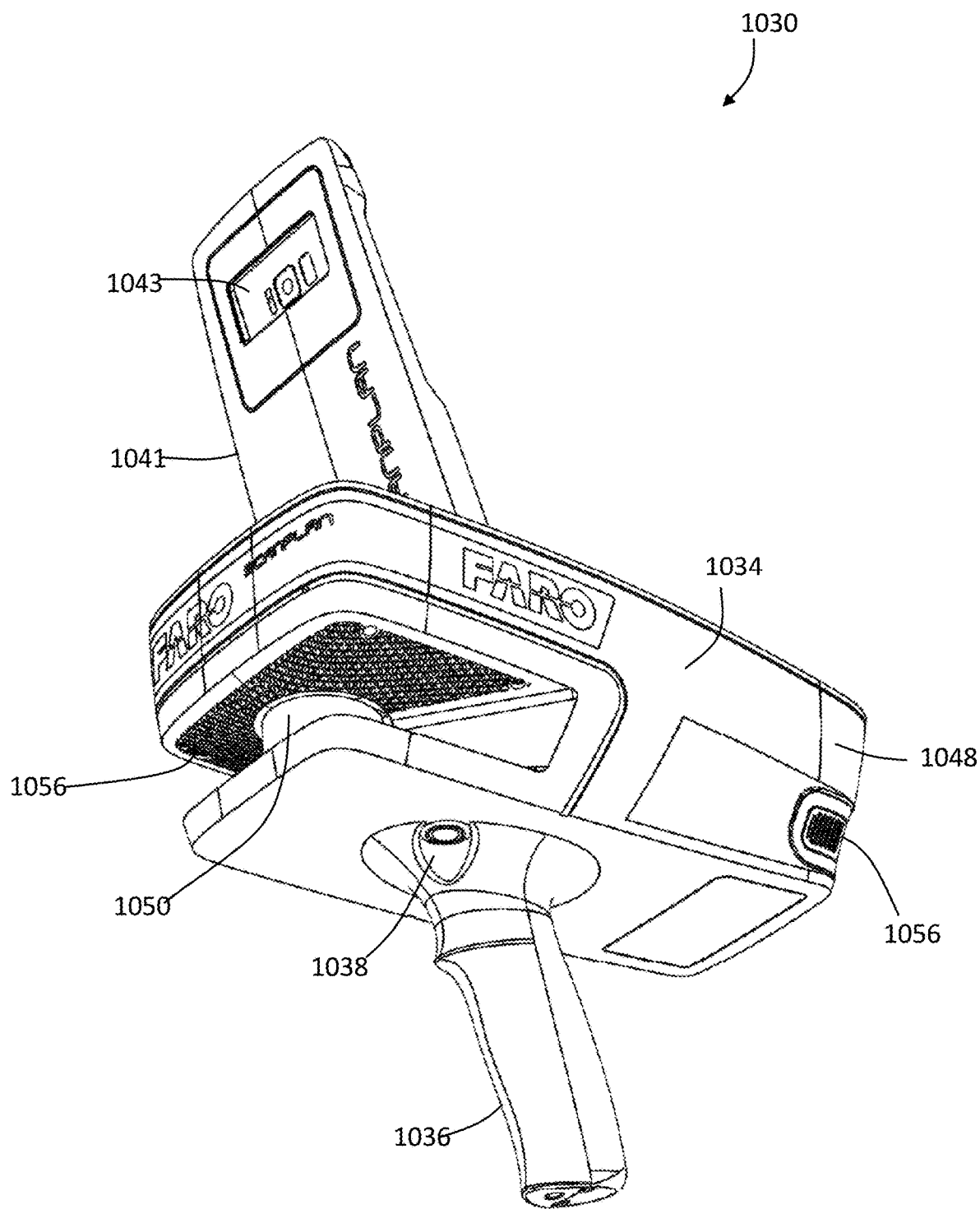
Figure 10C:
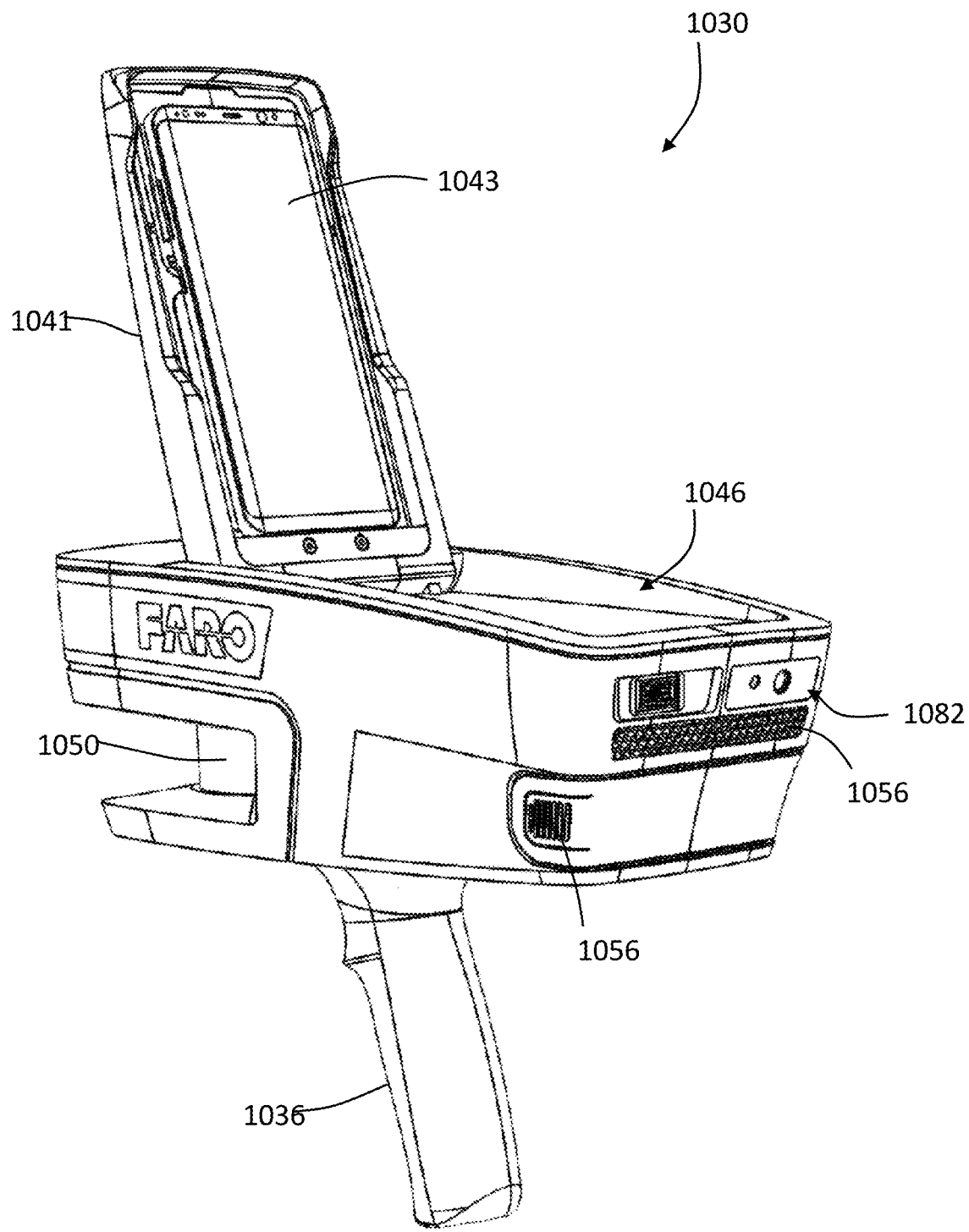
Figure 10D:
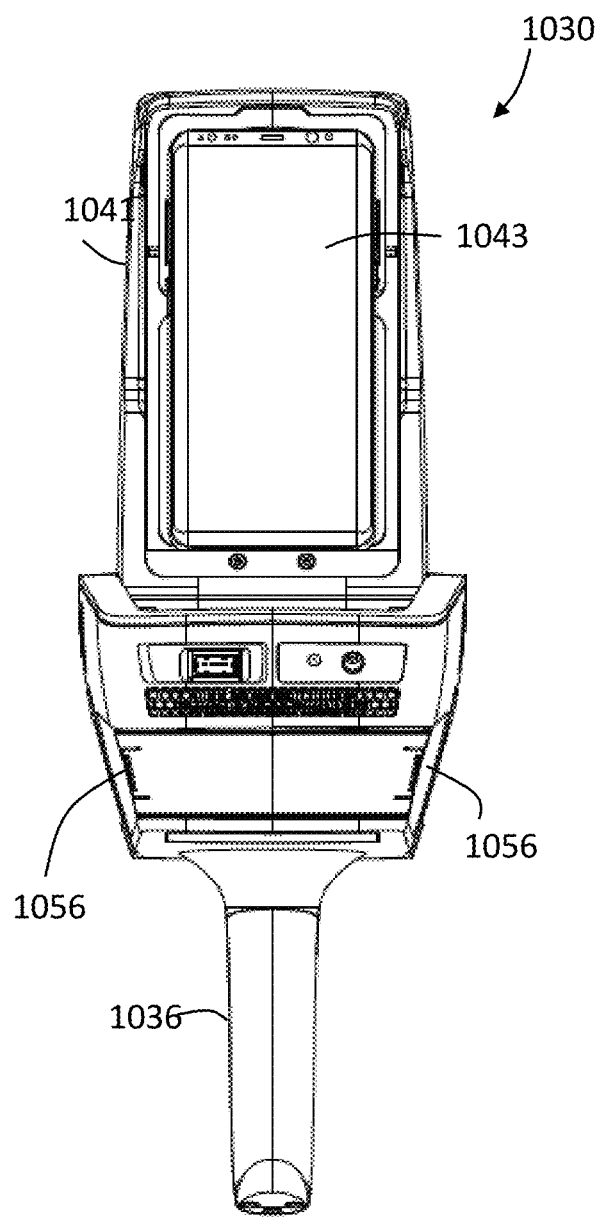
Figure 10E:
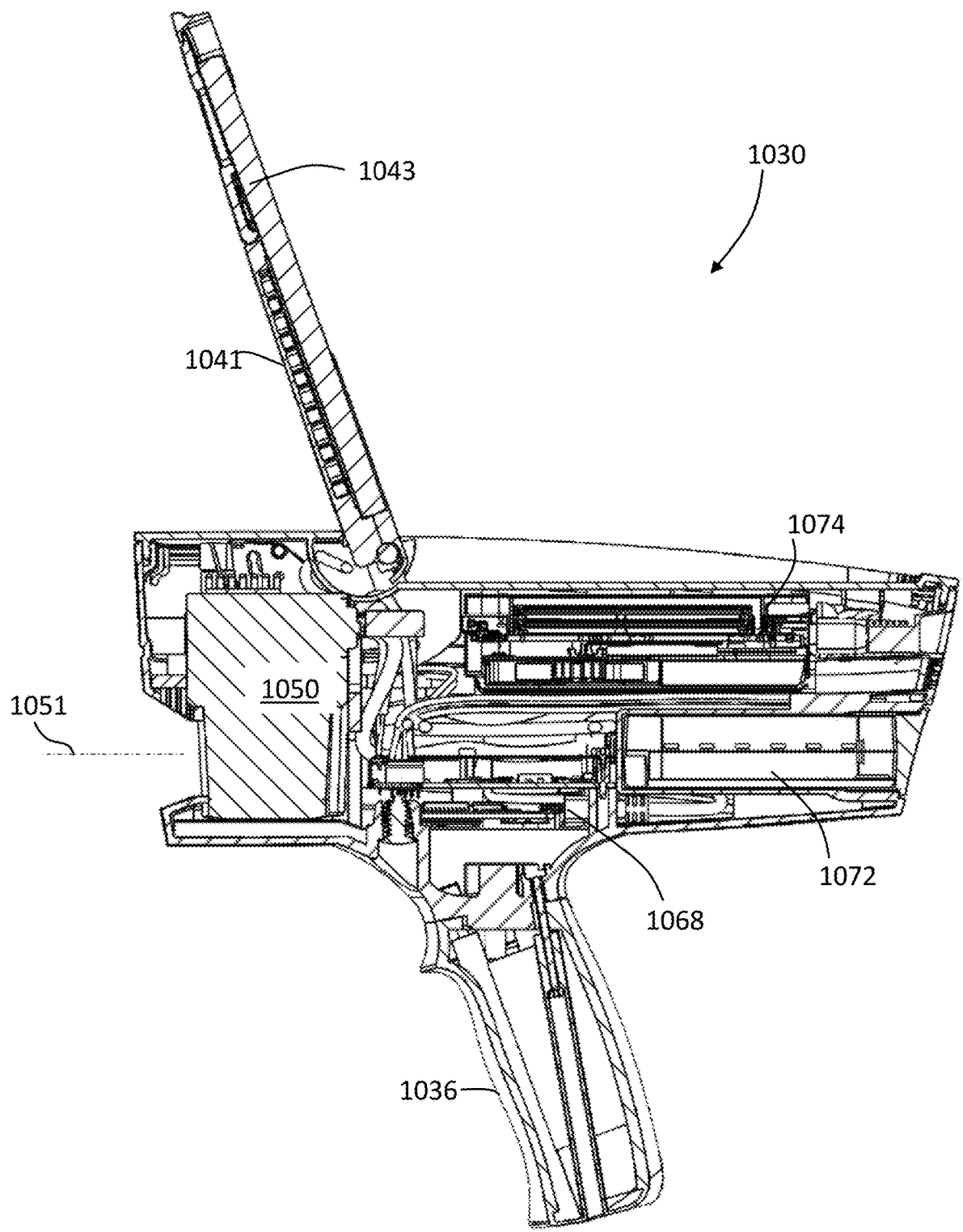
Figure 10F:
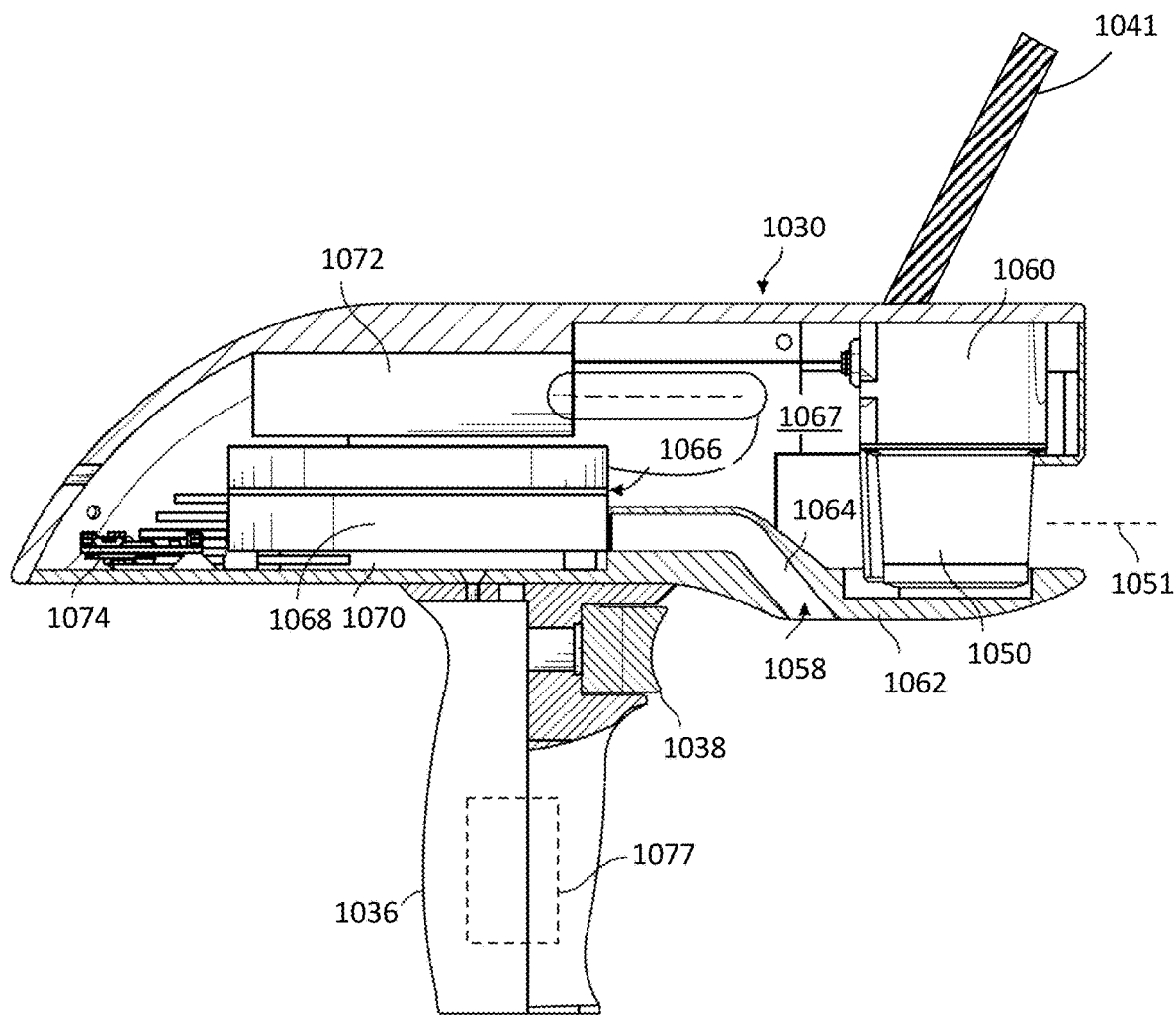
Figure 10G:
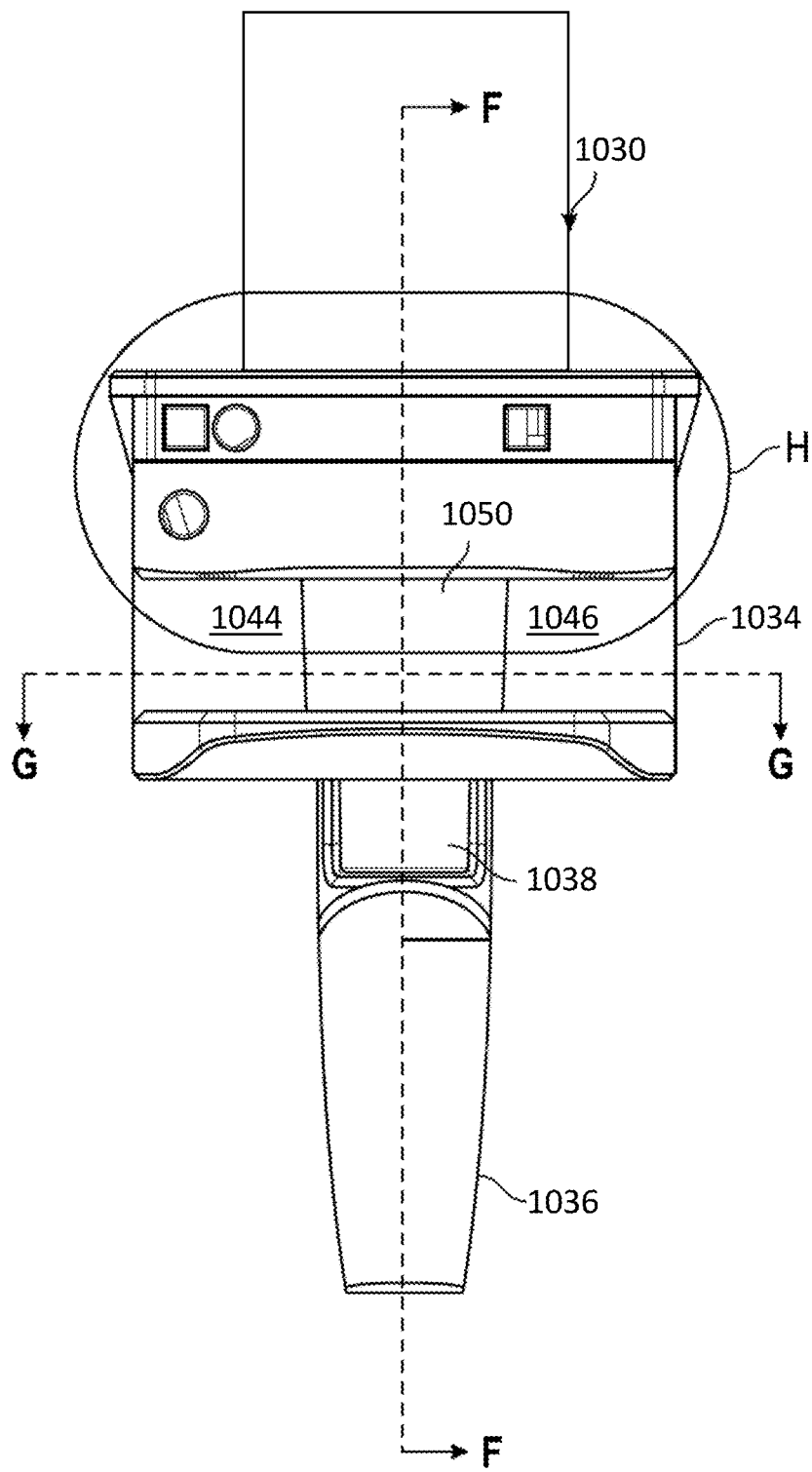
Figure 10H:
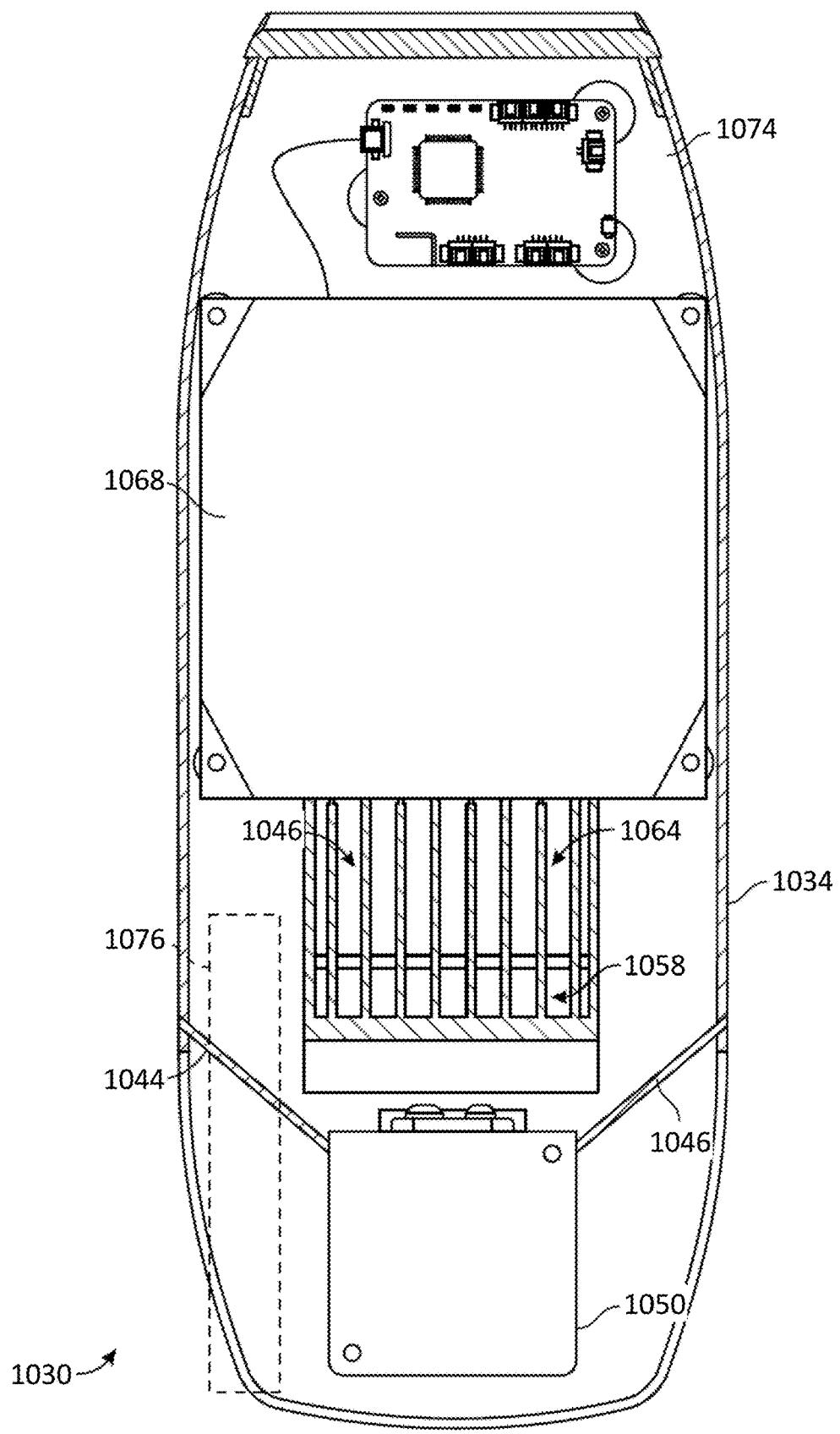
Figure 10I:
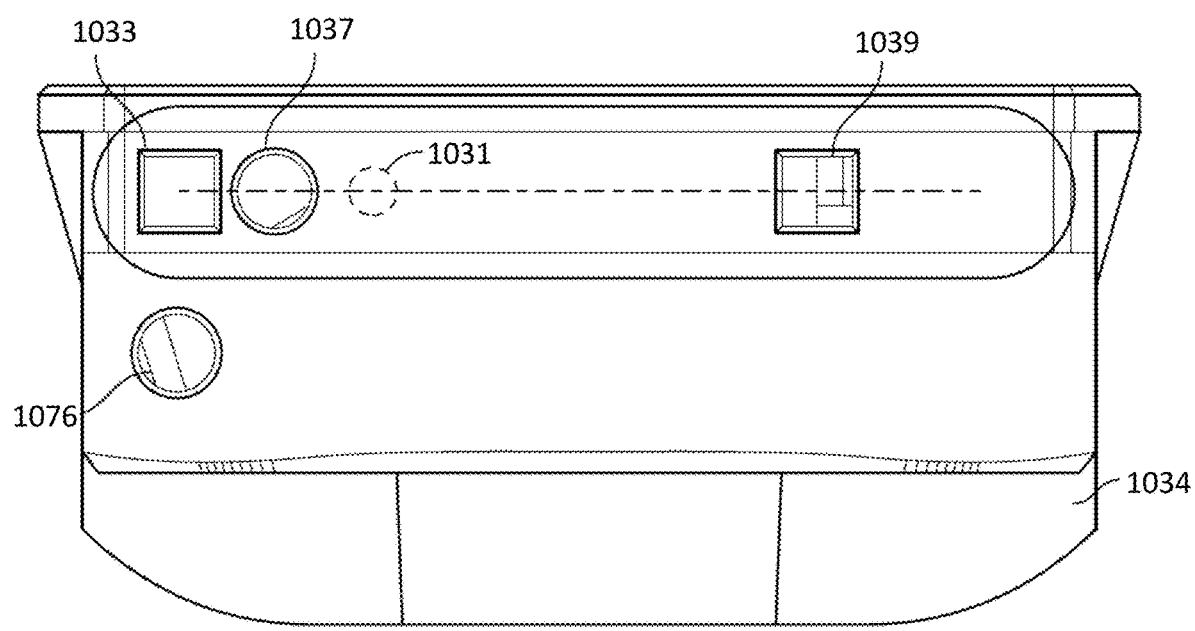
Figure 10J:
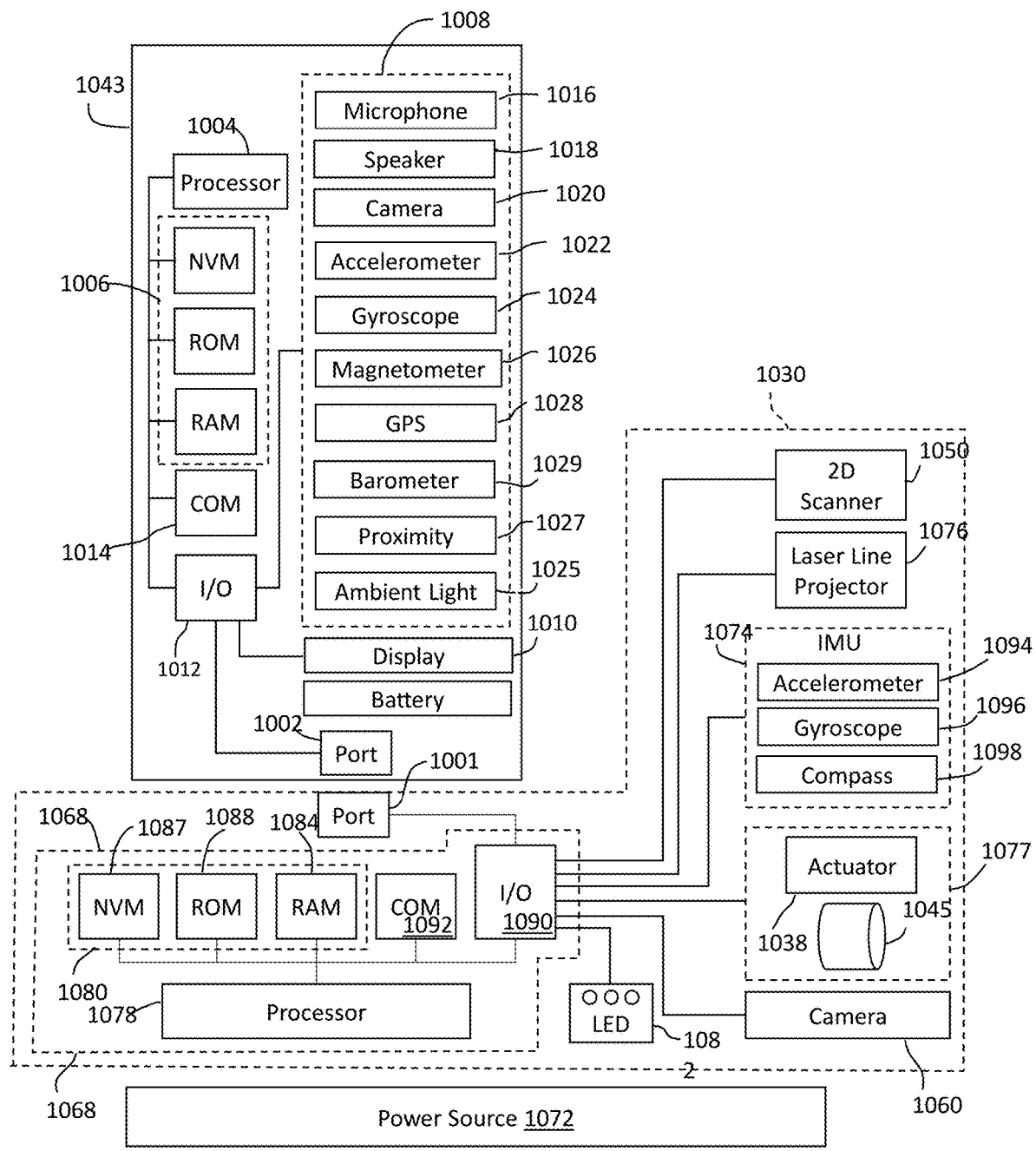
Figure 10K:
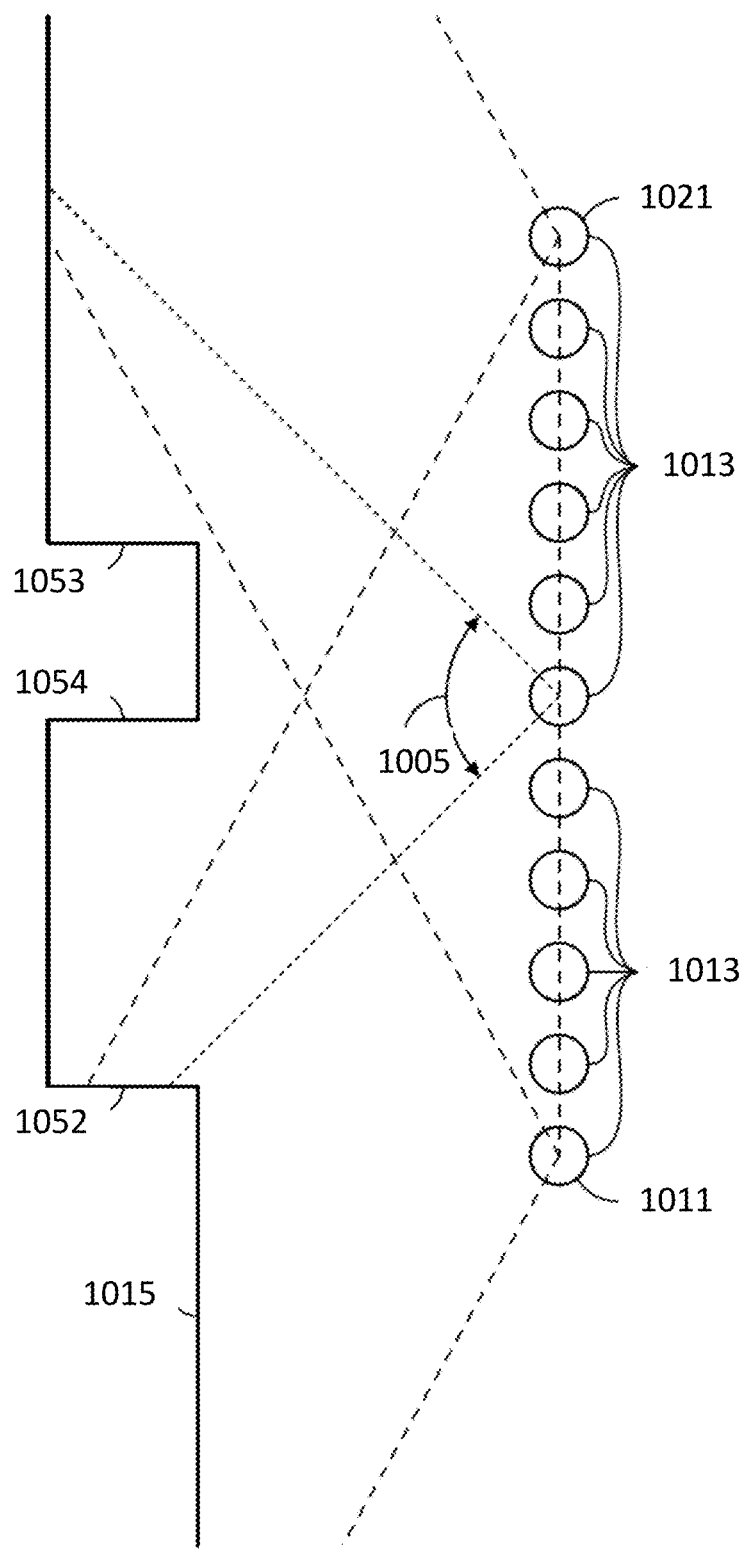
Figure 10L:
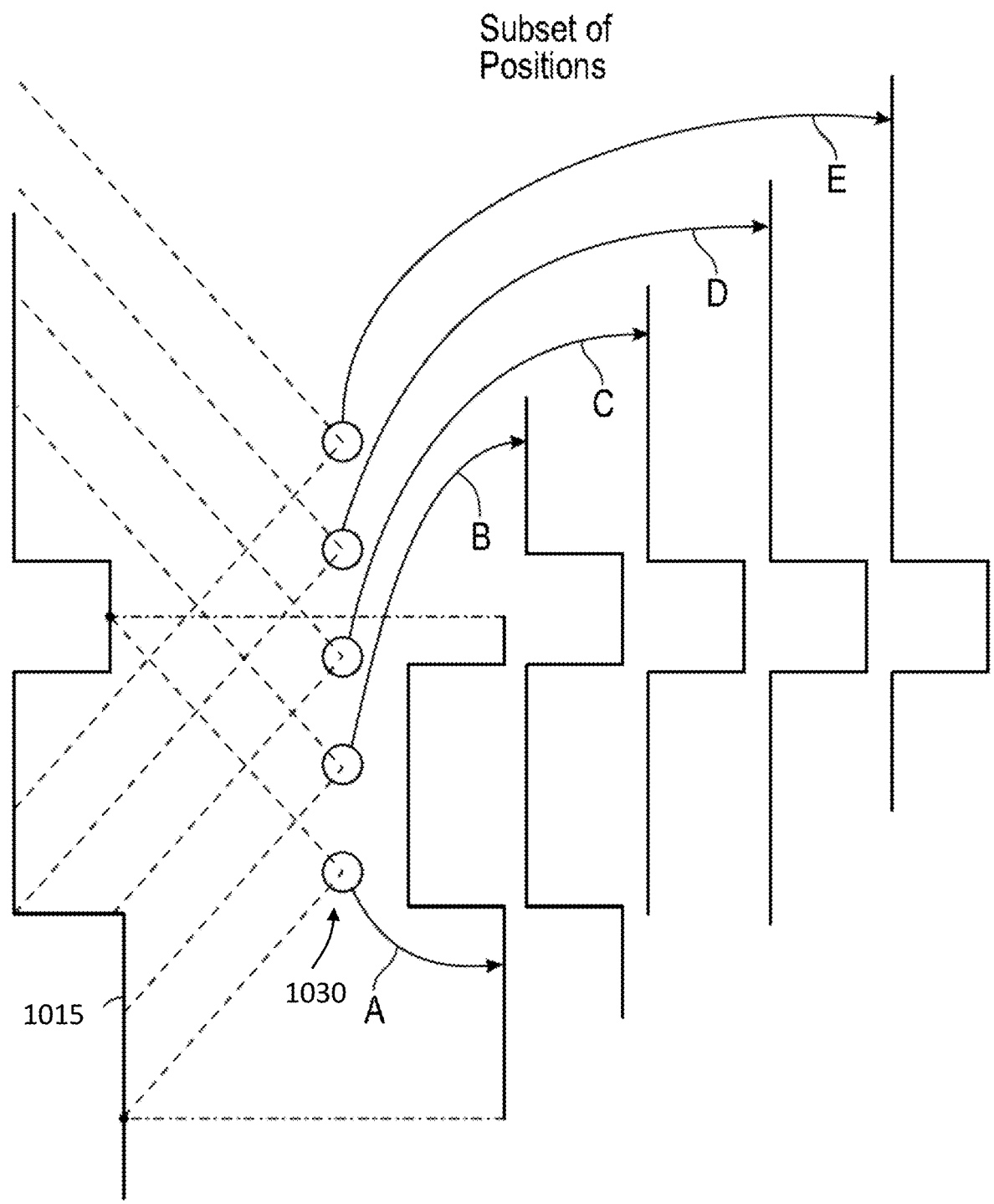
Figure 10M:
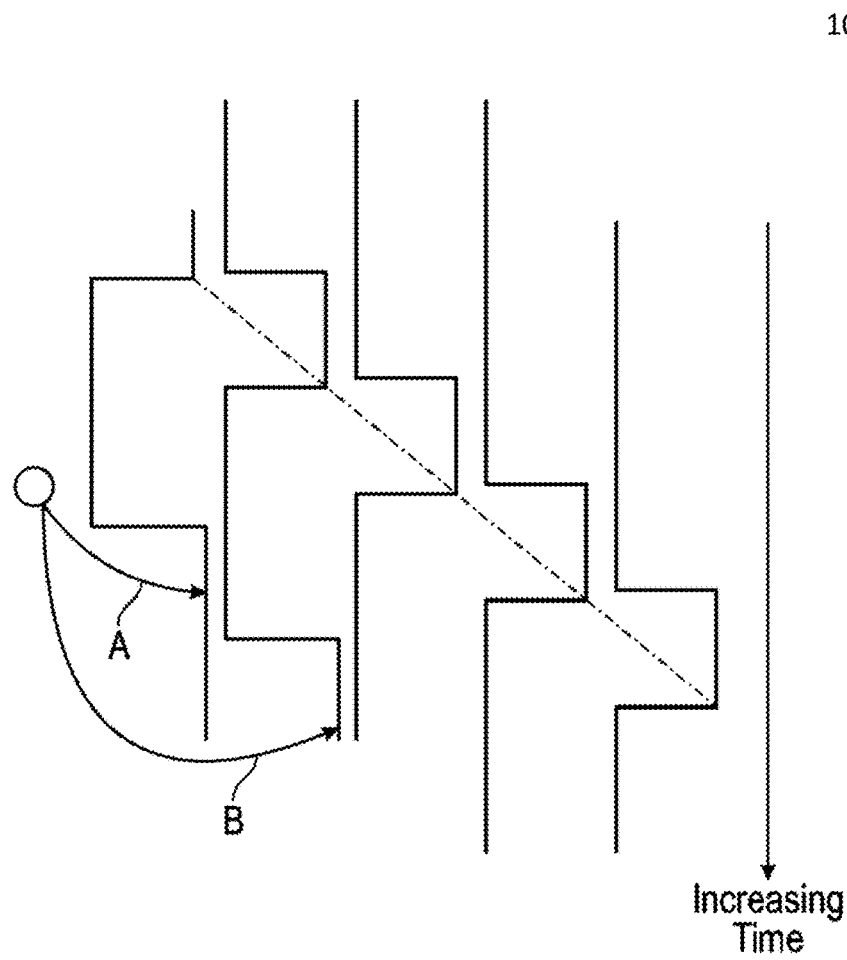
Figure 10N:
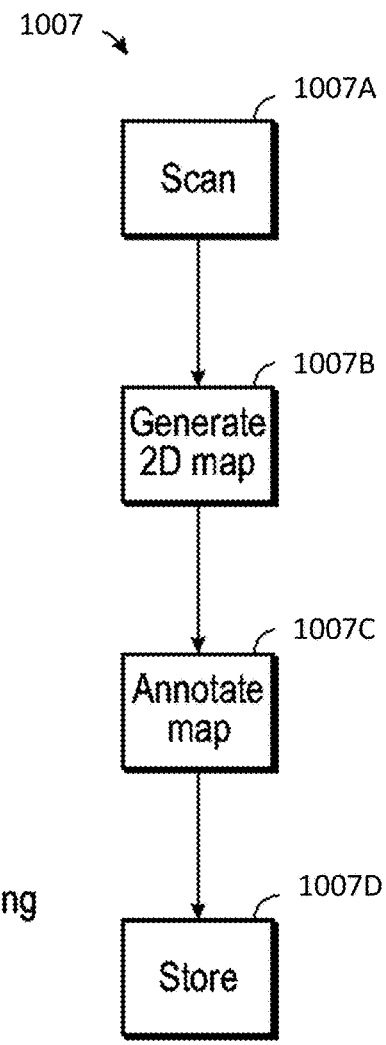
Figure 10O:
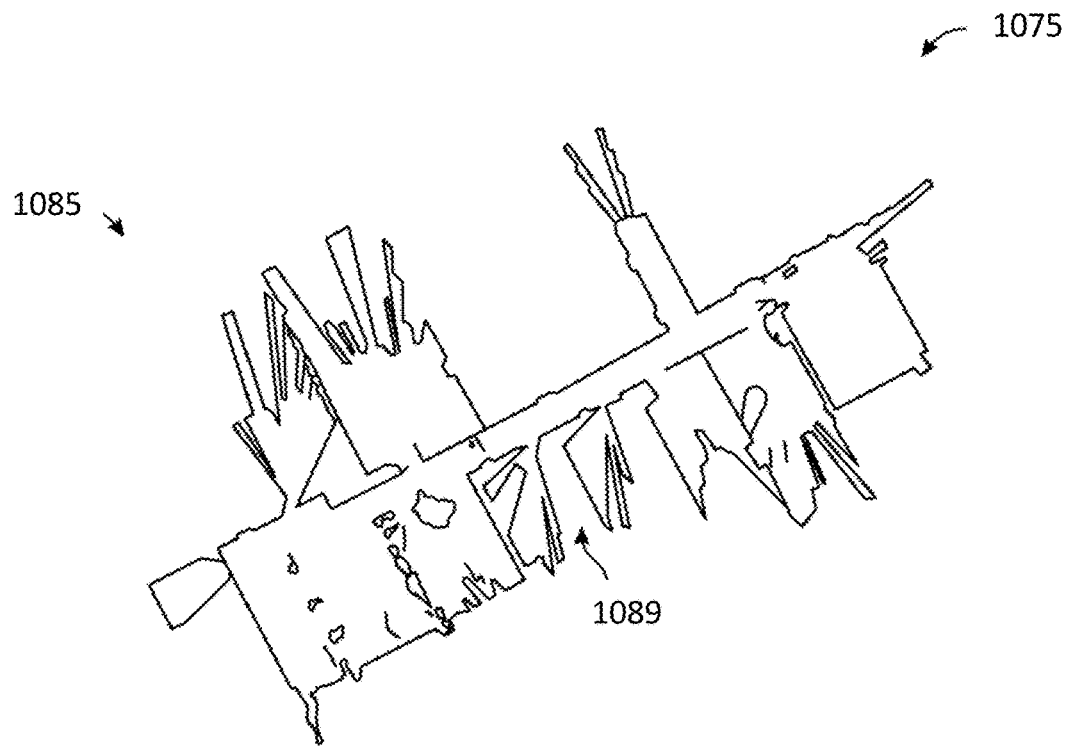
Figure 10P:
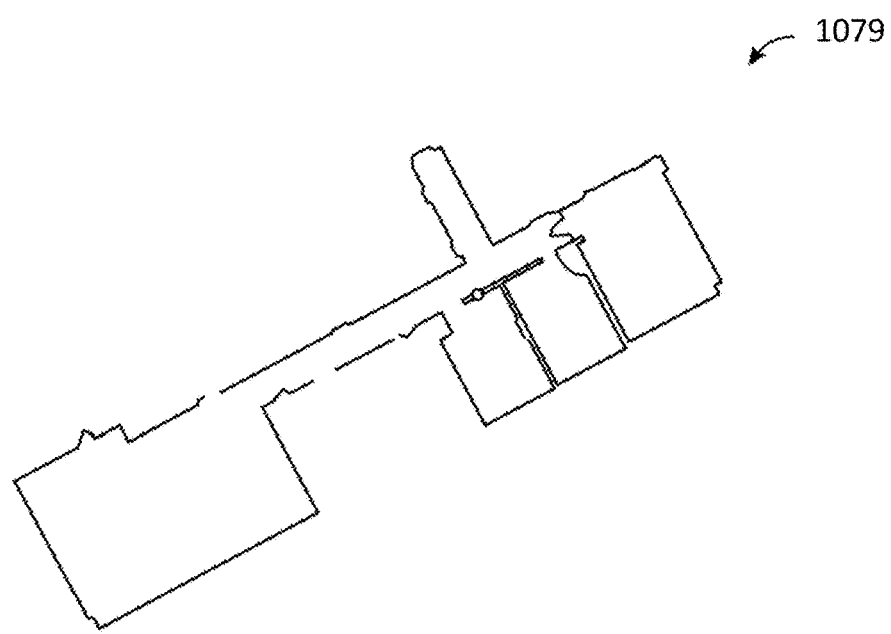
Figure 10Q:
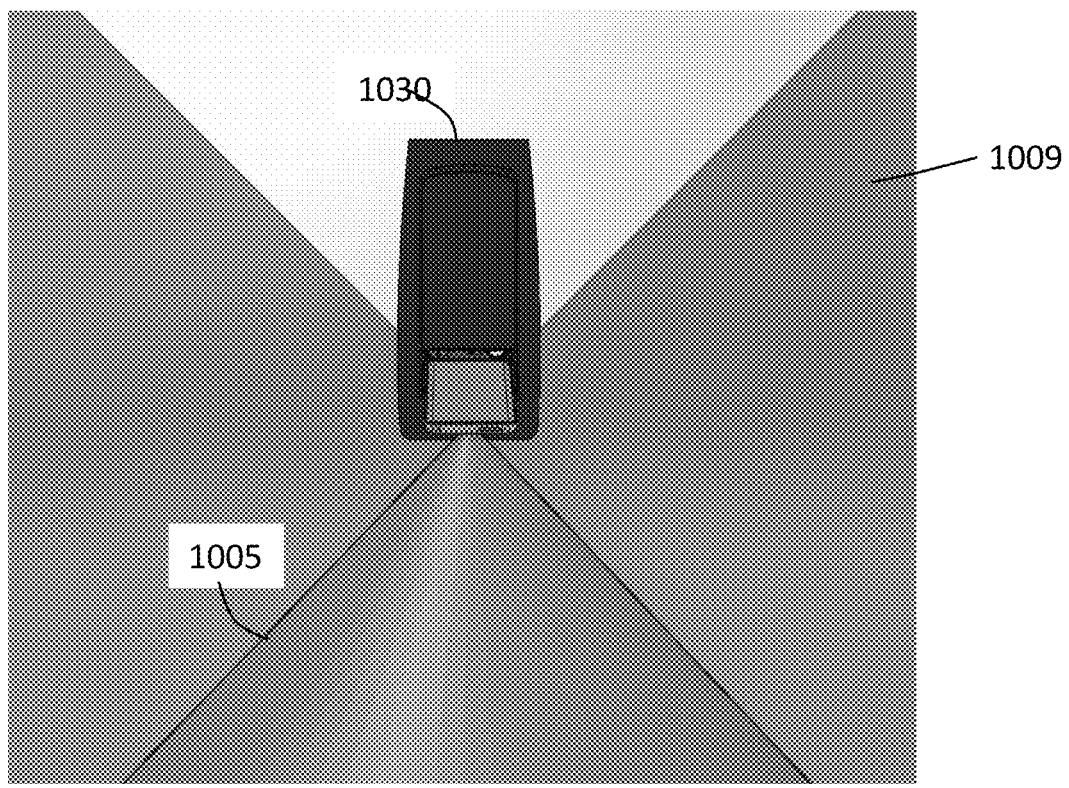
Figure 10R:
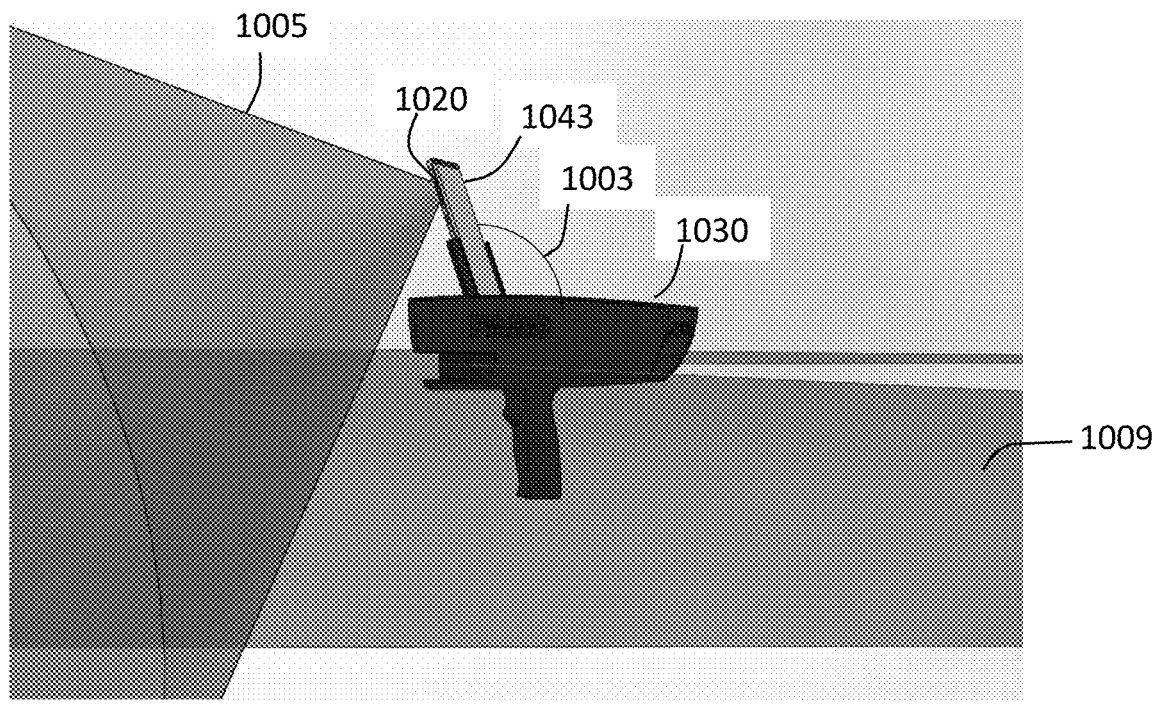

Referring now to FIGS. 10A-10R, an embodiment of a 2D scanner 1030 is shown having a housing 1032 that includes a body portion 1034 and a removable handle portion 1036. It should be appreciated that while the embodiment of FIGS. 10A-10R illustrate the 2D scanner 1030 with the handle 1036 attached, the handle 1036 may be removed before the 2D scanner 1030 is coupled to the base unit 302 when used in the embodiment shown. In an embodiment, the handle 1036 may include an actuator 1038 that allows the operator to interact with the scanner 1030. In the exemplary embodiment, the body 1034 includes a generally rectangular center portion 1035 with a slot 1040 formed in an end 1042. The slot 1040 is at least partially defined by a pair walls 1044 that are angled towards a second end 1048. As will be discussed in more detail herein, a portion of a 2D laser scanner 1050 is arranged between the walls 1044. The walls 1044 are angled to allow the 2D laser scanner 1050 to operate by emitting a light over a large angular area without interference from the walls 1044. As will be discussed in more detail herein, the end 1042 may further include a three-dimensional camera or RGBD camera.

Extending from the center portion 1035 is a mobile device holder 1041. The mobile device holder 1041 is configured to securely couple a mobile device 1043 to the housing 1032. The holder 1041 may include one or more fastening elements, such as a magnetic or mechanical latching element for example, that couples the mobile device 1043 to the housing 1032. In an embodiment, the mobile device 1043 is coupled to communicate with a controller 1068. The communication between the controller 1068 and the mobile device 1043 may be via any suitable communications medium, such as wired, wireless or optical communication mediums for example.

In the illustrated embodiment, the holder 1041 is pivotally coupled to the housing 1032, such that it may be selectively rotated into a closed position within a recess 1046. In an embodiment, the recess 1046 is sized and shaped to receive the holder 1041 with the mobile device 1043 disposed therein.

In the exemplary embodiment, the second end 1048 includes a plurality of exhaust vent openings 1056. In an embodiment, shown in FIGS. 10F-I, the exhaust vent openings 1056 are fluidly coupled to intake vent openings 1058 arranged on a bottom surface 1062 of center portion 1035. The intake vent openings 1058 allow external air to enter a conduit 1064 having an opposite opening 1066 in fluid communication with the hollow interior 1067 of the body 1034. In an embodiment, the opening 1066 is arranged adjacent to a controller 1068 which has one or more processors that is operable to perform the methods described herein. In an embodiment, the external air flows from the opening 1066 over or around the controller 1068 and out the exhaust vent openings 1056.

In an embodiment, the controller 1068 is coupled to a wall 1070 of body 1034. In an embodiment, the wall 1070 is coupled to or integral with the handle 1036. The controller 1068 is electrically coupled to the 2D laser scanner 1050, the 3D camera 1060, a power source 1072, an inertial measurement unit (IMU) 1074, a laser line projector 1076 (FIG. 10E), and a haptic feedback device 1077.

Referring now to FIG. 10J, elements are shown of the scanner 1030 with the mobile device 1043 installed or coupled to the housing 1032. Controller 1068 is a suitable electronic device capable of accepting data and instructions, executing the instructions to process the data, and presenting the results. The controller 1068 includes one or more processing elements 1078. The processors may be microprocessors, field programmable gate arrays (FPGAs), digital signal processors (DSPs), and generally any device capable of performing computing functions. The one or more processors 1078 have access to memory 1080 for storing information.

Controller 1068 is capable of converting the analog voltage or current level provided by 2D laser scanner 1050, camera 1060 and IMU 1074 into a digital signal to determine a distance from the scanner 1030 to an object in the environment. In an embodiment, the camera 1060 is a 3D or RGBD type camera. Controller 1068 uses the digital signals that act as input to various processes for controlling the scanner 1030. The digital signals represent one or more scanner 1030 data including but not limited to distance to an object, images of the environment, acceleration, pitch orientation, yaw orientation and roll orientation. As will be discussed in more detail, the digital signals may be from components internal to the housing 1032 or from sensors and devices located in the mobile device 1043.

In general, when the mobile device 1043 is not installed, controller 1068 accepts data from 2D laser scanner 1050 and IMU 1074 and is given certain instructions for the purpose of generating a two-dimensional map of a scanned environment. Controller 1068 provides operating signals to the 2D laser scanner 1050, the camera 1060, laser line projector 1076 and haptic feedback device 1077. Controller 1068 also accepts data from IMU 1074, indicating, for example, whether the operator is operating in the system in the desired orientation. The controller 1068 compares the operational parameters to predetermined variances (e.g. yaw, pitch or roll thresholds) and if the predetermined variance is exceeded, generates a signal that activates the haptic feedback device 1077. The data received by the controller 1068 may be displayed on a user interface coupled to controller 1068. The user interface may be one or more LEDs (light-emitting diodes) 1082, an LCD (liquid-crystal diode) display, a CRT (cathode ray tube) display, or the like. A keypad may also be coupled to the user interface for providing data input to controller 1068. In one embodiment, the user interface is arranged or executed on the mobile device 1043.

The controller 1068 may also be coupled to external computer networks such as a local area network (LAN) and the Internet. A LAN interconnects one or more remote computers, which are configured to communicate with controllers 1068 using a well-known computer communications protocol such as TCP/IP (Transmission Control Protocol/Internet(^) Protocol), RS-232, ModBus, and the like. Additional scanners 1030 may also be connected to LAN with the controllers 1068 in each of these scanners 1030 being configured to send and receive data to and from remote computers and other scanners 1030. The LAN may be connected to the Internet. This connection allows controller 1068 to communicate with one or more remote computers connected to the Internet.

The processors 1078 are coupled to memory 1080. The memory 1080 may include random access memory (RAM) device 1084, a non-volatile memory (NVM) device 1086, a read-only memory (ROM) device 1088. In addition, the processors 1078 may be connected to one or more input/output (I/O) controllers 1090 and a communications circuit 1092. In an embodiment, the communications circuit 1092 provides an interface that allows wireless or wired communication with one or more external devices or networks, such as the LAN discussed above or the communications circuit 1018.

Controller 1068 includes operation control methods embodied in application code. These methods are embodied in computer instructions written to be executed by processors 1078, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hyper- Text Markup Language), Python, Ruby and any combination or derivative of at least one of the foregoing.

Coupled to the controller 1068 is the 2D laser scanner 1050. The 2D laser scanner 1050 measures 2D coordinates in a plane. In the exemplary embodiment, the scanning is performed by steering light within a plane to illuminate object points in the environment. The 2D laser scanner 1050 collects the reflected (scattered) light from the object points to determine 2D coordinates of the object points in the 2D plane. In an embodiment, the 2D laser scanner 1050 scans a spot of light over an angle while at the same time measuring an angle value and corresponding distance value to each of the illuminated object points.

Examples of 2D laser scanners 1050 include, but are not limited to Model LMS100 scanners manufactured by Sick, Inc. of Minneapolis, Minn. and scanner Models URG-04LX-UGO1 and UTM-30LX manufactured by Hokuyo Automatic Co., Ltd of Osaka, Japan. The scanners in the Sick LMS100 family measure angles over a 270-degree range and over distances up to 20 meters. The Hoyuko model URG-04LX-UG01 is a low-cost 2D scanner that measures angles over a 240-degree range and distances up to 20 meters. The Hoyuko model UTM-30LX is a 2D scanner that measures angles over a 270-degree range and to distances up to 30 meters. It should be appreciated that the above 2D scanners are exemplary and other types of 2D scanners are also available.

In an embodiment, the 2D laser scanner 1050 is oriented so as to scan a beam of light over a range of angles in a generally horizontal plane (relative to the floor of the environment being scanned). At instants in time the 2D laser scanner 1050 returns an angle reading and a corresponding distance reading to provide 2D coordinates of object points in the horizontal plane. In completing one scan over the full range of angles, the 2D laser scanner returns a collection of paired angle and distance readings. As the platform is moved from place to place, the 2D laser scanner 1050 continues to return 2D coordinate values. These 2D coordinate values are used to locate the position of the scanner 1030 thereby enabling the generation of a two-dimensional map or floorplan of the environment.

Also coupled to the controller 1086 is the IMU 1074. The IMU 1074 is a position/orientation sensor that may include accelerometers 1094 (inclinometers), gyroscopes 1096, a magnetometer or compass 1098, and altimeters. In the exemplary embodiment, the IMU 1074 includes multiple accelerometers 1094 and gyroscopes 1096. The compass 1098 indicates a heading based on changes in magnetic field direction relative to the earth's magnetic north. The IMU 1074 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 1074 determines the pose or orientation of the scanner 108 about three-axis to allow a determination of a yaw, roll and pitch parameter.

In the embodiment shown, the scanner 1030 further includes a camera 1060 that is a 3D or RGB-D camera. As used herein, the term 3D camera refers to a device that produces a two-dimensional image that includes distances to a point in the environment from the location of scanner 1030. The 3D camera 1060 may be a range camera or a stereo camera. In an embodiment, the 3D camera 1060 includes an RGB-D sensor that combines color information with a per-pixel depth information. In an embodiment, the 3D camera 1060 may include an infrared laser projector 1031, a left infrared camera 1033, a right infrared camera 1039, and a color camera 1037. In an embodiment, the 3D camera 1060 is a RealSense™ camera model R200 manufactured by Intel Corporation.

In an embodiment, when the mobile device 1043 is coupled to the housing 1032, the mobile device 1043 becomes an integral part of the scanner 1030. In an embodiment, the mobile device 1043 is a cellular phone, a tablet computer or a personal digital assistant (PDA). The mobile device 1043 may be coupled for communication via a wired connection, such as ports 1001, 1002. The port 1001 is coupled for communication to the processor 1078, such as via I/O controller 1090 for example. The ports 1001, 1002 may be any suitable port, such as but not limited to USB, USB-A, USB-B, USB-C, IEEE 13910 (Firewire), or Lightning™ connectors.

The mobile device 1043 is a suitable electronic device capable of accepting data and instructions, executing the instructions to process the data, and presenting the results. The mobile device 1043 includes one or more processors 1004. The processors 1004 may be microprocessors, field programmable gate arrays (FPGAs), digital signal processors (DSPs), and generally any device capable of performing computing functions. The one or more processors 1004 have access to memory 1006 for storing information.

The mobile device 1043 is capable of converting the analog voltage or current level provided by sensors 1008 and processor 1078. Mobile device 1043 uses the digital signals that act as input to various processes for controlling the scanner 1030. The digital signals represent one or more platform data including but not limited to distance to an object, images of the environment, acceleration, pitch orientation, yaw orientation, roll orientation, global position, ambient light levels, and altitude for example.

In general, mobile device 1043 accepts data from sensors 1008 and is given certain instructions for the purpose of generating or assisting the processor 1078 in the generation of a two-dimensional map or three-dimensional map of a scanned environment. Mobile device 1043 provides operating signals to the processor 1078, the sensors 1008 and a display 1010. Mobile device 1043 also accepts data from sensors 1008, indicating, for example, to track the position of the mobile device 1043 in the environment or measure coordinates of points on surfaces in the environment. The mobile device 1043 compares the operational parameters to predetermined variances (e.g. yaw, pitch or roll thresholds) and if the predetermined variance is exceeded, may generate a signal. The data received by the mobile device 1043 may be displayed on display 1010. In an embodiment, the display 1010 is a touch screen device that allows the operator to input data or control the operation of the scanner 1030.

The controller 1068 may also be coupled to external networks such as a local area network (LAN), a cellular network and the Internet. A LAN interconnects one or more remote computers, which are configured to communicate with controller 68 using a well-known computer communications protocol such as TCP/IP (Transmission Control Protocol/Internet(ˆ) Protocol), RS-232, ModBus, and the like. Additional scanners 1030 may also be connected to LAN with the controllers 1068 in each of these scanners 1030 being configured to send and receive data to and from remote computers and other scanners 1030. The LAN may be connected to the Internet. This connection allows controller 1068 to communicate with one or more remote computers connected to the Internet.

The processors 1004 are coupled to memory 1006. The memory 1006 may include random access memory (RAM) device, a non-volatile memory (NVM) device, and a read-only memory (ROM) device. In addition, the processors 1004 may be connected to one or more input/output (I/O) controllers 1012 and a communications circuit 1014. In an embodiment, the communications circuit 1014 provides an interface that allows wireless or wired communication with one or more external devices or networks, such as the LAN or the cellular network discussed above.

Controller 1068 includes operation control methods embodied in application code. These methods are embodied in computer instructions written to be executed by processors 1078, 1004, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Also coupled to the processor 1004 are the sensors 1008. The sensors 1008 may include but are not limited to: a microphone 1016; a speaker 1018; a front or rear facing camera 1020; accelerometers 1022 (inclinometers), gyroscopes 1024, a magnetometers or compass 1026; a global positioning satellite (GPS) module 1028; a barometer 1029; a proximity sensor 1027; and an ambient light sensor 1025. By combining readings from a combination of sensors 1008 with a fusion algorithm that may include a Kalman filter, relatively accurate position and orientation measurements can be obtained.

It should be appreciated that the sensors 1060, 1074 integrated into the scanner 1030 may have different characteristics than the sensors 1008 of mobile device 1043. For example, the resolution of the cameras 1060, 1020 may be different, or the accelerometers 1094, 1022 may have different dynamic ranges, frequency response, sensitivity (mV/g) or temperature parameters (sensitivity or range). Similarly, the gyroscopes 1096, 1024 or compass/magnetometer may have different characteristics. It is anticipated that in some embodiments, one or more sensors 1008 in the mobile device 1043 may be of higher accuracy than the corresponding sensors 1074 in the scanner 1030. As described in more detail herein, in some embodiments the processor 1078 determines the characteristics of each of the sensors 1008 and compares them with the corresponding sensors in the scanner 1030 when the mobile device. The processor 1078 then selects which sensors 1074, 1008 are used during operation. In some embodiments, the mobile device 1043 may have additional sensors (e.g. microphone 1016, camera 1020) that may be used to enhance operation compared to operation of the scanner 1030 without the mobile device 1043. In still further embodiments, the scanner 1030 does not include the IMU 1074 and the processor 1078 uses the sensors 1008 for tracking the position and orientation/pose of the scanner 1030. In still further embodiments, the addition of the mobile device 1043 allows the scanner 1030 to utilize the camera 1020 to perform three-dimensional (3D) measurements either directly (using an RGB-D camera) or using photogrammetry techniques to generate 3D maps. In an embodiment, the processor 1078 uses the communications circuit (e.g. a cellular 10G internet connection) to transmit and receive data from remote computers or devices.

In an embodiment, the scanner 1030 determines a quality attribute/parameter for the tracking of the scanner 1030 and/or the platform 100. In an embodiment, the tracking quality attribute is a confidence level in the determined tracking positions and orientations to actual positions and orientations. When the confidence level crosses a threshold, the scanner 1030 may provide feedback to the operator to perform a stationary scan. It should be appreciated that a stationary scan will provide a highly accurate measurements that will allow the determination of the position and orientation of the scanner or platform with a high level of confidence. In an embodiment, the feedback is provided via a user interface. The user interface may be on the scanner 1030, or a platform associated with the scanner 1030.

In the exemplary embodiment, the scanner 1030 is a handheld portable device that is sized and weighted to be carried by a single person during operation. Therefore, the plane 1009 in which the 2D laser scanner 1050 projects a light beam may not be horizontal relative to the floor or may continuously change as the computer moves during the scanning process. Thus, the signals generated by the accelerometers 1094, gyroscopes 1096 and compass 1098 (or the corresponding sensors 1008) may be used to determine the pose (yaw, roll, tilt) of the scanner 108 and determine the orientation of the plane 1051.

In an embodiment, it may be desired to maintain the pose of the scanner 1030 (and thus the plane 1009) within predetermined thresholds relative to the yaw, roll and pitch orientations of the scanner 1030. In an embodiment, a haptic feedback device 1077 is disposed within the housing 1032, such as in the handle 1036. The haptic feedback device 1077 is a device that creates a force, vibration or motion that is felt or heard by the operator. The haptic feedback device 1077 may be, but is not limited to: an eccentric rotating mass vibration motor or a linear resonant actuator for example. The haptic feedback device is used to alert the operator that the orientation of the light beam from 2D laser scanner 1050 is equal to or beyond a predetermined threshold. In operation, when the IMU 1074 measures an angle (yaw, roll, pitch or a combination thereof), the controller 1068 transmits a signal to a motor controller 1038 that activates a vibration motor 1045. Since the vibration originates in the handle 1036, the operator will be notified of the deviation in the orientation of the scanner 1030. The vibration continues until the scanner 1030 is oriented within the predetermined threshold or the operator releases the actuator 1038. In an embodiment, it is desired for the plane 1009 to be within 10-15 degrees of horizontal (relative to the ground) about the yaw, roll and pitch axes.

In an embodiment, the 2D laser scanner 1050 makes measurements as the scanner 1030 is moved around in an environment, such from a first position 1011 to a second registration position 1072. In an embodiment, the scan data is collected and processed as the scanner 1030 passes through a plurality of 2D measuring positions 1021. At each measuring position 1021, the 2D laser scanner 1050 collects 2D coordinate data over an effective FOV 1005. Using methods described in more detail below, the controller 1068 uses 2D scan data from the plurality of 2D scans at positions 1021 to determine a position and orientation of the scanner 1030 as it is moved about the environment. In an embodiment, the common coordinate system is represented by 2D Cartesian coordinates x, y and by an angle of rotation θ relative to the x or y axis. In an embodiment, the x and y axes lie in the plane of the 2D scanner and may be further based on a direction of a "front" of the 2D laser scanner 1050.

FIG. 10M shows the scanner 1030 collecting 2D scan data at selected positions 1021 over an effective FOV 1005. At different positions 1021, the 2D laser scanner 1050 captures a portion of the object 1015 marked A, B, C, D, and E (FIG. 10L). FIG. 10M shows 2D laser scanner 1050 moving in time relative to a fixed frame of reference of the object 1015.

FIG. 10M includes the same information as FIG. 10L but shows it from the frame of reference of the scanner 1030 rather than the frame of reference of the object 1015. FIG. 10M illustrates that in the scanner 1030 frame of reference, the position of features on the object change over time. Therefore, the distance traveled by the scanner 1030 can be determined from the 2D scan data sent from the 2D laser scanner 1050 to the controller 1068.

As the 2D laser scanner 1050 takes successive 2D readings and performs best-fit calculations, the controller 1068 keeps track of the translation and rotation of the 2D laser scanner 1050, which is the same as the translation and rotation of the scanner 1030. In this way, the controller 1068 is able to accurately determine the change in the values of x, y, $\theta$ as the scanner 1030 moves from the first position 1011 to the second position 1021.

In an embodiment, the controller 1068 is configured to determine a first translation value, a second translation value, along with first and second rotation values (yaw, roll, pitch) that, when applied to a combination of the first 2D scan data and second 2D scan data, results in transformed first 2D data that closely matches transformed second 2D data according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. An example of an "objective mathematical criterion" is that of minimizing the sum of squared residual errors for those portions of the scan data determined to overlap. Another type of objective mathematical criterion may involve a matching of multiple features identified on the object. For example, such features might be the edge transitions 1052, 1053, and 1054. The mathematical criterion may involve processing of the raw data provided by the 2D laser scanner 1050 to the controller 1068, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008, which is incorporated by reference herein.

In an embodiment, assuming that the plane 1009 of the light beam from 2D laser scanner 1050 remains horizontal relative to the ground plane, the first translation value is dx, the second translation value is dy, and the first rotation value d$\theta$. If the first scan data is collected with the 2D laser scanner 1050 having translational and rotational coordinates (in a reference coordinate system) of $(x_1, y_1, \theta_1)$, then when the second 2D scan data is collected at a second location the coordinates are given by $(x_2, y_2, \theta_2)=(x_1+dx, y_1+dy, \theta_1+d\theta)$. In an embodiment, the controller 1068 is further configured to determine a third translation value (for example, dz) and a second and third rotation values (for example, pitch and roll). The third translation value, second rotation value, and third rotation value may be determined based at least in part on readings from the IMU 1074.

The 2D laser scanner 1050 collects 2D scan data starting at the first position 1011 and more 2D scan data at the second position 1021. In some cases, these scans may suffice to determine the position and orientation of the scanner 1030 at the second position 1021 relative to the first position 1011. In other cases, the two sets of 2D scan data are not sufficient to enable the controller 1068 to accurately determine the first translation value, the second translation value, and the first rotation value. This problem may be avoided by collecting 2D scan data at intermediate scan positions 1013. In an embodiment, the 2D scan data is collected and processed at regular intervals, for example, once per second. In this way, features in the environment are identified in successive 2D scans at positions 1013. In an embodiment, when more than two 2D scans are obtained, the controller 1068 may use the information from all the successive 2D scans in determining the translation and rotation values in moving from the first position 1011 to the second position 1021. In another embodiment, only the first and last scans in the final calculation, simply using the intermediate 2D scans to ensure proper correspondence of matching features. In most cases, accuracy of matching is improved by incorporating information from multiple successive 2D scans.

It should be appreciated that as the scanner 1030 is moved beyond the second position 1021, a two-dimensional image or map of the environment being scanned may be generated. It should further be appreciated that in addition to generating a 2D map of the environment, the data from scanner 1030 may be used to generate (and store) a 2D trajectory of the scanner 1030 as it is moved through the environment. In an embodiment, the 2D map and/or the 2D trajectory may be combined or fused with data from other sources in the registration of measured 3D coordinates. It should be appreciated that the 2D trajectory may represent a path followed by the 2D scanner 1030.

Referring now to FIG. 10N, a method 1007 is shown for generating a two-dimensional map with annotations. The method 1007 starts in block 1007A where the facility or area is scanned to acquire scan data 1075, such as that shown in FIG. 10O. The scanning is performed by carrying the scanner 1030 through the area to be scanned. The scanner 1030 measures distances from the scanner 1030 to an object, such as a wall for example, and also a pose of the scanner 1030 in an embodiment the user interacts with the scanner 1030 via actuator 1038. In the illustrated embodiments, the mobile device 1043 provides a user interface that allows the operator to initiate the functions and control methods described herein. Using the registration process desired herein, the two-dimensional locations of the measured points on the scanned objects (e.g. walls, doors, windows, cubicles, file cabinets etc.) may be determined. It is noted that the initial scan data may include artifacts, such as data that extends through a window 1085 or an open door 1089 for example. Therefore, the scan data 1075 may include additional information that is not desired in a 2D map or layout of the scanned area.

The method 1007 then proceeds to block 1007B where a 2D map 1079 is generated of the scanned area as shown in FIG. 10N. The generated 2D map 1079 represents a scan of the area, such as in the form of a floor plan without the artifacts of the initial scan data. It should be appreciated that the 2D map 1079 represents a dimensionally accurate representation of the scanned area that may be used to determine the position and pose of the mobile scanning platform in the environment to allow the registration of the 3D coordinate points measured by the 3D measurement device 110. In the embodiment of FIG. 10N, the method 1007 then proceeds to block 1007C where optional user-defined annotations are made to the 2D maps 1079 to define an annotated 2D map that includes information, such as dimensions of features, the location of doors, the relative positions of objects (e.g. liquid oxygen tanks, entrances/exits or egresses or other notable features such as but not limited to the location of automated sprinkler systems, knox or key boxes, or fire department connection points ("FDC"). In an embodiment, the annotation may also be used to define scan locations where the mobile scanning platform stops and uses the scanner 1030 to perform a stationary scan of the environment.

Once the annotations of the 2D annotated map are completed, the method 1007 then proceeds to block 1007D where the 2D map is stored in memory, such as nonvolatile memory 1087 for example. The 2D map may also be stored in a network accessible storage device or server so that it may be accessed by the desired personnel.

Referring now to FIG. 10Q and FIG. 10R an embodiment is illustrated with the mobile device 1043 coupled to the scanner 1030. As described herein, the 2D laser scanner 1050 emits a beam of light in the plane 1009. The 2D laser scanner 1050 has a field of view (FOV) that extends over an angle that is less than 360 degrees. In the exemplary embodiment, the FOV of the 2D laser scanner is about 270 degrees. In this embodiment, the mobile device 1043 is coupled to the housing 1032 adjacent the end where the 2D laser scanner 1050 is arranged. The mobile device 1043 includes a forward-facing camera 1020. The camera 1020 is positioned adjacent a top side of the mobile device and has a predetermined field of view 1005. In the illustrated embodiment, the holder 1041 couples the mobile device 1043 on an obtuse angle 1003. This arrangement allows the mobile device 1043 to acquire images of the floor and the area directly in front of the scanner 1030 (e.g. the direction the operator is moving the platform).

In embodiments where the camera 1020 is an RGB-D type camera, three-dimensional coordinates of surfaces in the environment may be directly determined in a mobile device coordinate frame of reference. In an embodiment, the holder 1041 allows for the mounting of the mobile device 1043 in a stable position (e.g. no relative movement) relative to the 2D laser scanner 1050. When the mobile device 1043 is coupled to the housing 1032, the processor 1078 performs a calibration of the mobile device 1043 allowing for a fusion of the data from sensors 1008 with the sensors of scanner 1030. As a result, the coordinates of the 2D laser scanner may be transformed into the mobile device coordinate frame of reference or the 3D coordinates acquired by camera 1020 may be transformed into the 2D scanner coordinate frame of reference.

In an embodiment, the mobile device is calibrated to the 2D laser scanner 1050 by assuming the position of the mobile device based on the geometry and position of the holder 1041 relative to 2D laser scanner 1050. In this embodiment, it is assumed that the holder that causes the mobile device to be positioned in the same manner. It should be appreciated that this type of calibration may not have a desired level of accuracy due to manufacturing tolerance variations and variations in the positioning of the mobile device 1043 in the holder 1041. In another embodiment, a calibration is performed each time a different mobile device 1043 is used. In this embodiment, the user is guided (such as via the user interface/display 1010) to direct the scanner 1030 to scan a specific object, such as a door, that can be readily identified in the laser readings of the scanner 1030 and in the camera-sensor 1020 using an object recognition method.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A system of generating an automatically segmented and annotated two-dimensional (2D) map of an environment, the system comprising:
   a scanner configured to capture a 2D map comprising one or more point clouds comprising coordinate measurements of one or more points from the environment;
   one or more processors operably coupled to the scanner, the one or more processors being responsive to executable instructions for converting the 2D map into a 2D image;
   a portable computing device having a second image sensor, the portable computing device being coupled for communication to the one or more processors, wherein the one or more processors are responsive to correlate a location captured by a first image from the portable computing device with the location in the 2D map of the environment in response to the first image being acquired by the second image sensor; and
   a mapping system configured to:
      categorize a first set of pixels from the image into room-inside, room-outside, and noise by applying a trained neural network to the image;
      further categorize a first subset of pixels from the first set of pixels based on a room type, the first subset of pixels comprising pixels that are categorized as room-inside;
      determine the room type of a second subset of pixels from the first set of pixels based on the first subset of pixels by using a flooding algorithm; and
      annotate a portion of the 2D map to identify the room type based on the room type associated with one or more pixels corresponding to the portion.

2. The system of claim 1, wherein the mapping system is further configured to perform automatic segmentation of the 2D image subsequent to the categorization of the pixels from the image.

3. The system of claim 2, wherein the automatic segmentation is performed using one or more of morphological segmentation, Voronoi segmentation, and distance-based segmentation.

4. The system of claim 1, wherein the annotating further comprises determining a label that identifies a type of an object and adding the label to the 2D map proximate to a location of the object.

5. The system of claim 4, wherein the label of the object is wall, the updating the 2D map includes adding the wall to the 2D map as a geometric element at the location.

6. The system of claim 1, wherein the scanner is a 2D scanner disposed in a body of a housing, the housing being sized to be carried by a single person during operation, the body having a first plane extending there through.

7. A method for generating a two-dimensional (2D) map of an environment, the method comprising:
- capturing, by a scanner, a 2D map comprising one or more point clouds comprising coordinate measurements of one or more points from the environment;
- converting the 2D map into a 2D image by one or more processors operably coupled to the scanner, the one or more processors being responsive to executable instructions, wherein the one or more processors correlate a location captured by a first image by a portable computing device with the location in the 2D map of the environment in response to the first image being acquired by the portable computing device;
- categorizing a first set of pixels from the image into room-inside, room-outside, and noise by applying a trained neural network to the image;
- further categorizing a first subset of pixels from the first set of pixels based on a room type, the first subset of pixels comprising pixels that are categorized as room-inside;
- determining the room type of a second subset of pixels from the first set of pixels based on the first subset of pixels by using a flooding algorithm; and
- annotating a portion of the 2D map to identify the room type based on the room type associated with one or more pixels corresponding to the portion.

8. The method of claim 7, further comprising performing automatic segmentation of the 2D image subsequent to the categorization of the pixels from the image.

9. The method of claim 8, wherein the automatic segmentation is performed using one or more of morphological segmentation, Voronoi segmentation, and distance-based segmentation.

10. The method of claim 7, wherein the annotating further comprises determining a label that identifies a type of an object and adding the label to the 2D map proximate to the location.

11. The method of claim 10, wherein the label of the object is wall, the updating the 2D map includes adding the wall to the 2D map as a geometric element at a location of the object.

12. The method of claim 7, wherein the scanner is a 2D scanner disposed in a body of a housing, the housing being sized to be carried by a single person during operation, the body having a first plane extending there through.

13. A computer program product comprising a memory device with computer executable instructions stored thereon, which when executed by one or more processing units causes the one or more processing units to execute a method for generating a two-dimensional (2D) map of an environment, the method comprising:
- receiving a 2D map comprising one or more point clouds comprising coordinate measurements of one or more points from the environment captured by a scanner;
- correlating a location captured by a first image by a portable computing device with the location in the 2D map of the environment in response to the first image being acquired by the portable computing device;
- converting the 2D map into a 2D image by one or more processors operably coupled to the scanner;
- categorizing a first set of pixels from the image into room-inside, room-outside, and noise by applying a trained neural network to the image;
- further categorizing a first subset of pixels from the first set of pixels based on a room type, the first subset of pixels comprising pixels that are categorized as room-inside;
- determining the room type of a second subset of pixels from the first set of pixels based on the first subset of pixels by using a flooding algorithm; and
- annotating a portion of the 2D map to identify the room type based on the room type associated with one or more pixels corresponding to the portion.

14. The computer program product of claim 13, wherein the method further comprises performing automatic segmentation of the 2D image subsequent to the categorization of the pixels from the image.

15. The computer program product of claim 13, wherein the annotating further comprises determining a label that identifies a type of an object and adding the label to the 2D map proximate to a location of the object.

16. The computer program product of claim 15, wherein the label of the object is wall, the updating the 2D map includes adding the wall to the 2D map as a geometric element at the location.

17. The computer program product of claim 13, wherein the scanner is a 2D scanner disposed in a body of a housing, the housing being sized to be carried by a single person during operation, the body having a first plane extending there through.

18. A system of generating an automatically segmented and annotated two-dimensional (2D) map of an environment, the system comprising:
- a scanner configured to capture a 2D map comprising one or more point clouds comprising coordinate measurements of one or more points from the environment;
- one or more processors operably coupled to the scanner, the one or more processors being responsive to executable instructions for converting the 2D map into a 2D image;
- a mapping system configured to:
  - categorize a first set of pixels from the image into room-inside, room-outside, and noise by applying a trained neural network to the image;
  - further categorize a first subset of pixels from the first set of pixels based on a room type, the first subset of pixels comprising pixels that are categorized as room-inside;
  - perform automatic segmentation of the 2D image subsequent to the categorization of the pixels from the image, the automatic segmentation is performed using one or more of morphological segmentation, Voronoi segmentation, and distance-based segmentation;

determine the room type of a second subset of pixels from the first set of pixels based on the first subset of pixels by using a flooding algorithm; and annotate a portion of the 2D map to identify the room type based on the room type associated with one or more pixels corresponding to the portion.

19. A method for generating a two-dimensional (2D) map of an environment, the method comprising:

capturing, by a scanner, a 2D map comprising one or more point clouds comprising coordinate measurements of one or more points from the environment;

converting the 2D map into a 2D image by one or more processors operably coupled to the scanner, the one or more processors being responsive to executable instructions;

categorizing a first set of pixels from the image into room-inside, room-outside, and noise by applying a trained neural network to the image;

further categorizing a first subset of pixels from the first set of pixels based on a room type, the first subset of pixels comprising pixels that are categorized as room-inside;

performing automatic segmentation of the 2D image subsequent to the categorization of the pixels from the 2D image, wherein the automatic segmentation is performed using one or more of morphological segmentation, Voronoi segmentation, and distance-based segmentation;

determining the room type of a second subset of pixels from the first set of pixels based on the first subset of pixels by using a flooding algorithm; and annotating a portion of the 2D map to identify the room type based on the room type associated with one or more pixels corresponding to the portion.

* * * * *